Dec. 18, 1928.  C. F. PYM  1,695,559
MACHINE FOR SHAPING UPPERS OVER LASTS
Filed Feb. 15, 1923   21 Sheets-Sheet 1

INVENTOR
Charles F. Pym

Dec. 18, 1928.

C. F. PYM 1,695,559

MACHINE FOR SHAPING UPPERS OVER LASTS

Filed Feb. 15, 1923 21 Sheets-Sheet 4

Dec. 18, 1928.  
C. F. PYM  
1,695,559  
MACHINE FOR SHAPING UPPERS OVER LASTS  
Filed Feb. 15, 1923   21 Sheets-Sheet 5

INVENTOR  
Charles F. Pym

Dec. 18, 1928. 1,695,559
C. F. PYM
MACHINE FOR SHAPING UPPERS OVER LASTS
Filed Feb. 15, 1923    21 Sheets-Sheet 6
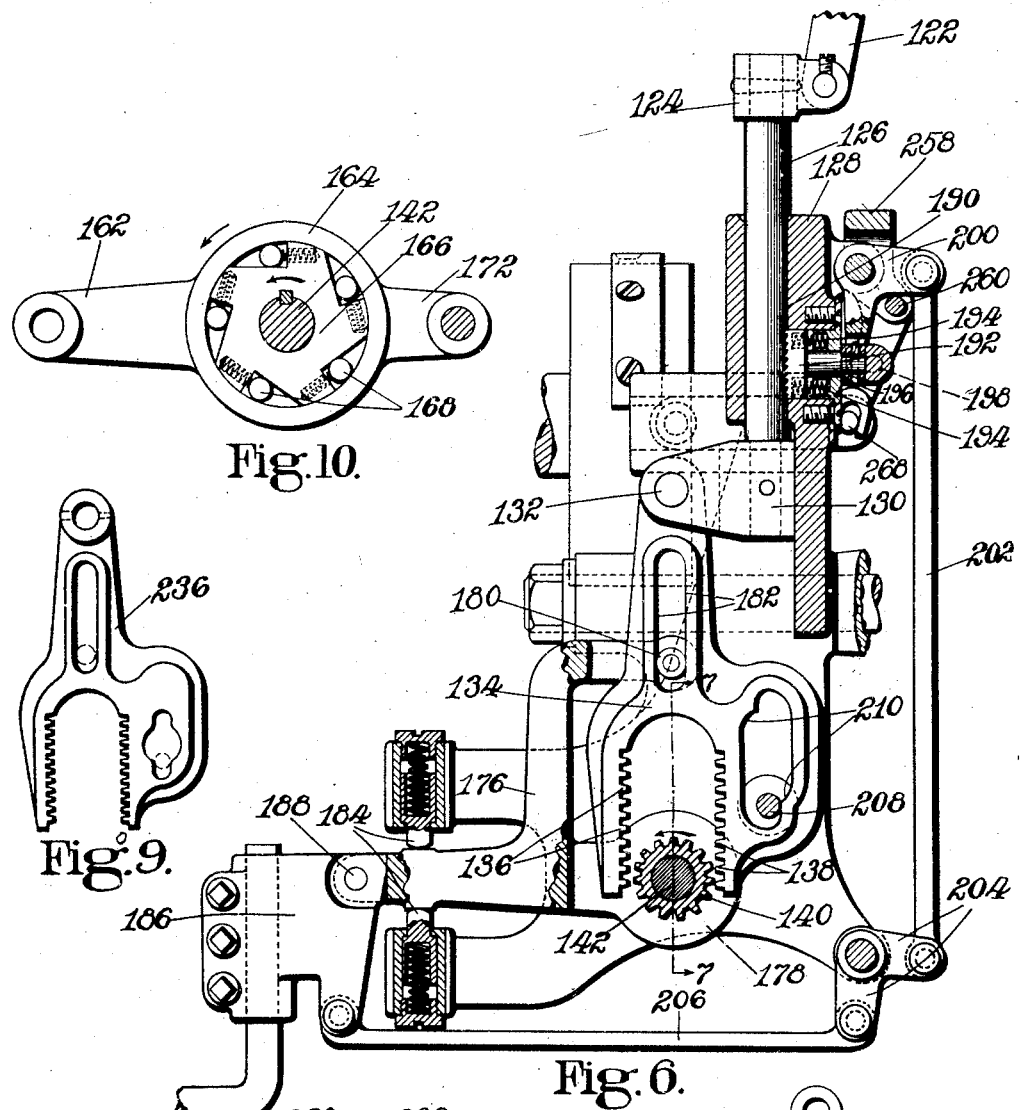
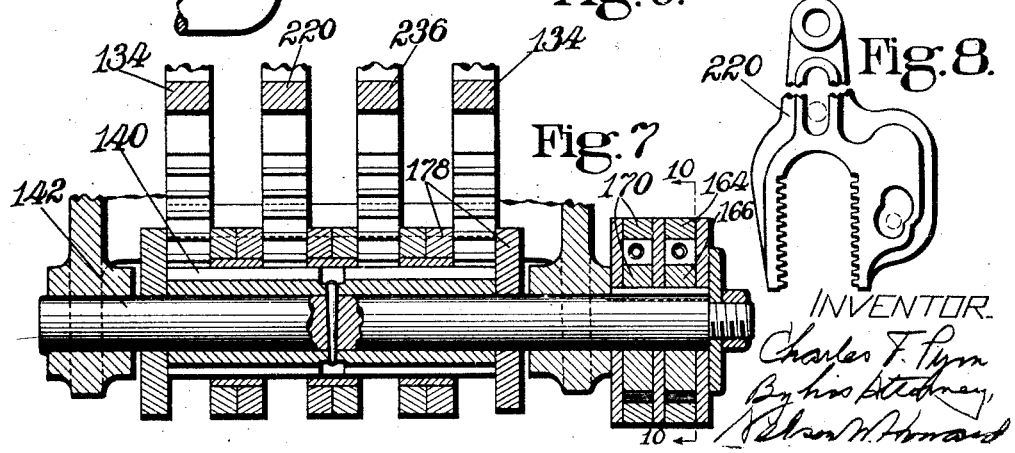
INVENTOR.
Charles F. Pym
By his Attorney, Dec. 18, 1928.　　　　　　　　　　　　　　　　　　1,695,559
C. F. PYM
MACHINE FOR SHAPING UPPERS OVER LASTS
Filed Feb. 15, 1923　　　21 Sheets-Sheet 7
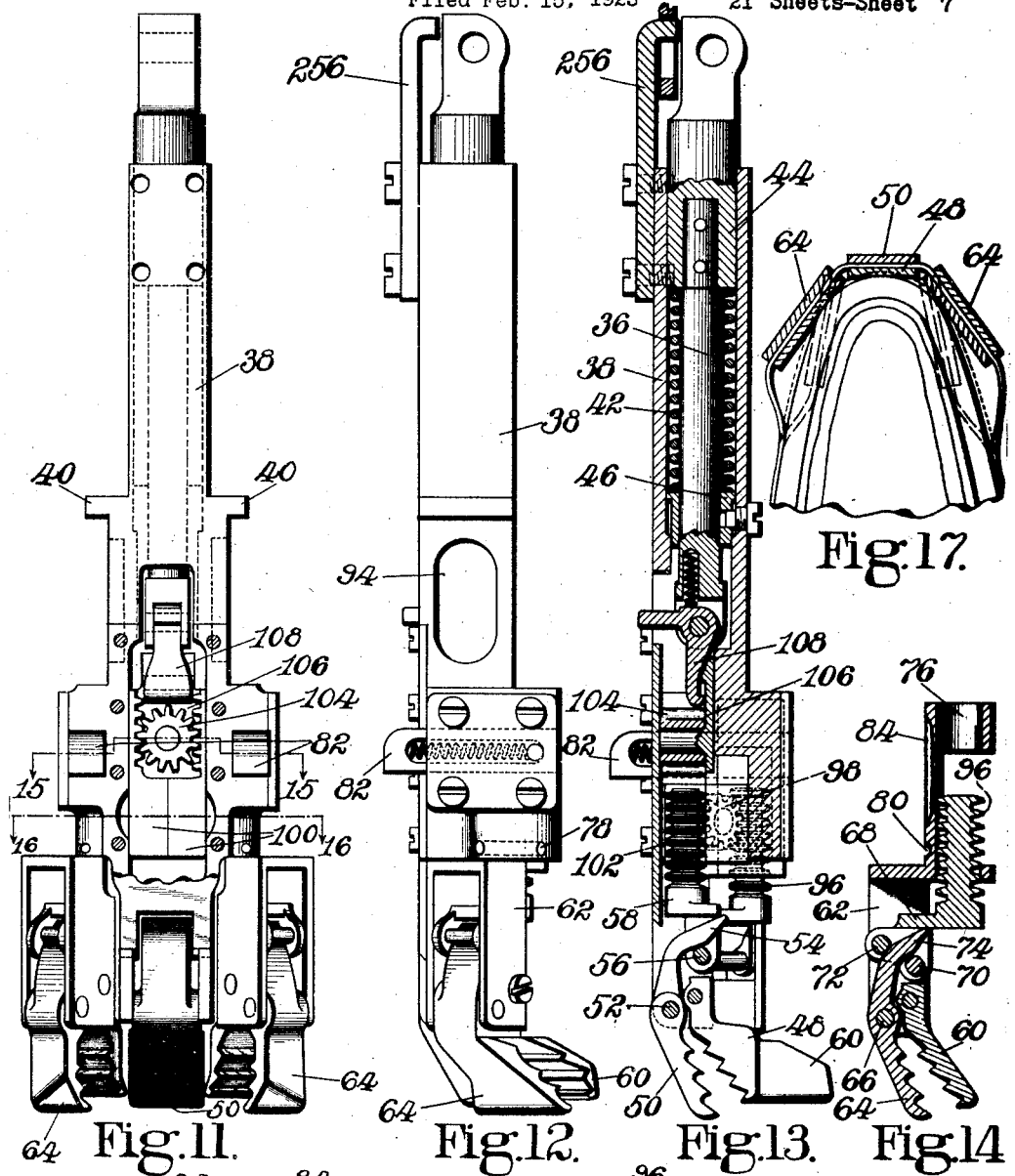

Dec. 18, 1928.

C. F. PYM 1,695,559

MACHINE FOR SHAPING UPPERS OVER LASTS

Filed Feb. 15, 1923

INVENTOR.
Charles F. Pym
By his Attorney,

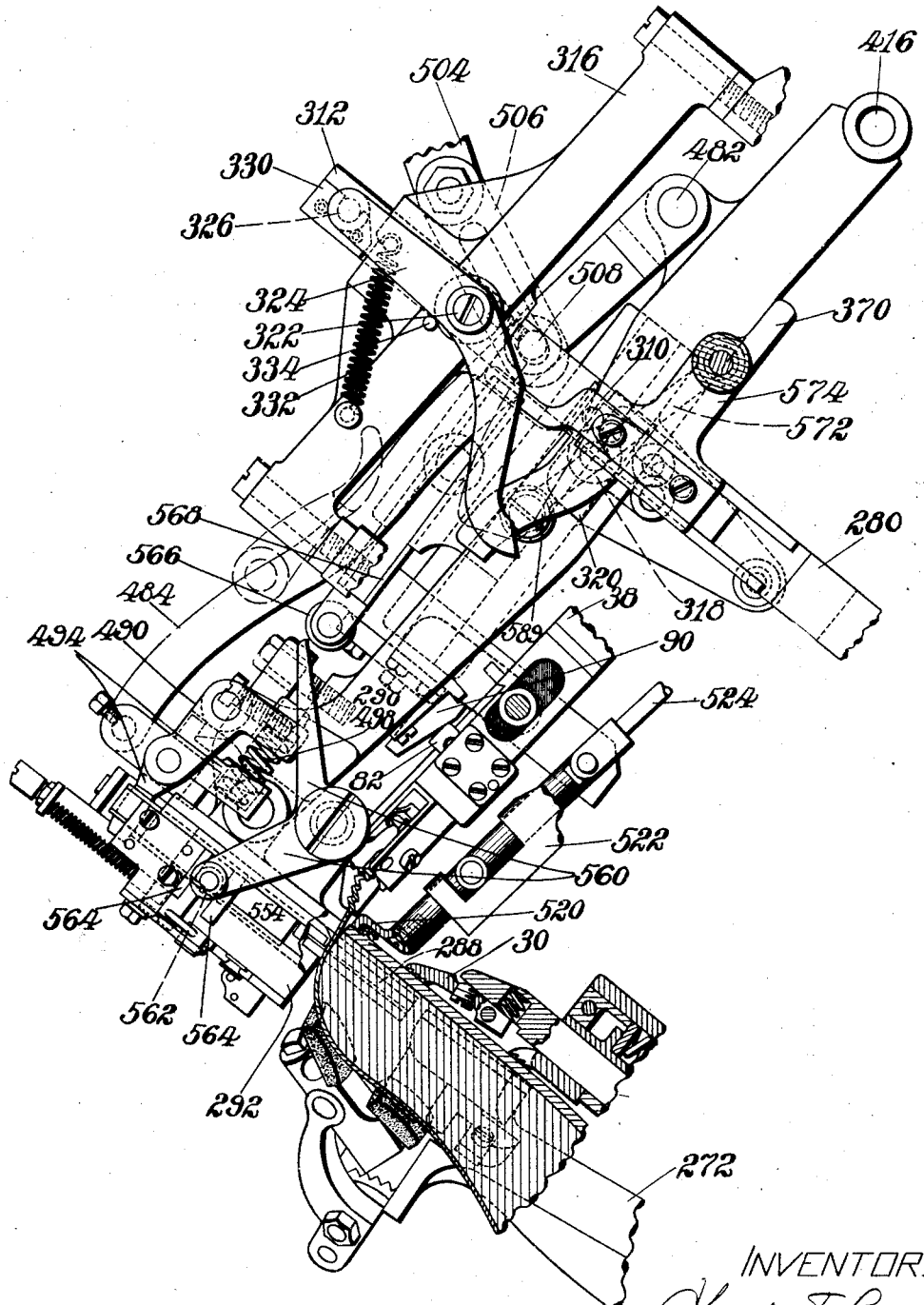
Fig.18ᵃ

Dec. 18, 1928.

C. F. PYM 1,695,559

MACHINE FOR SHAPING UPPERS OVER LASTS

Filed Feb. 15, 1923

INVENTOR.
Charles F. Pym

Dec. 18, 1928.  
C. F. PYM  
1,695,559  
MACHINE FOR SHAPING UPPERS OVER LASTS  
Filed Feb. 15, 1923  
21 Sheets-Sheet 12

INVENTOR

Dec. 18, 1928.  1,695,559
C. F. PYM
MACHINE FOR SHAPING UPPERS OVER LASTS
Filed Feb. 15, 1923   21 Sheets-Sheet 13

INVENTOR
Charles F. Pym

Dec. 18, 1928.

C. F. PYM 1,695,559

MACHINE FOR SHAPING UPPERS OVER LASTS

Filed Feb. 15, 1923   21 Sheets-Sheet 14

INVENTOR.
Charles F. Pym
By his Attorney,
Nelson N. Howard

Dec. 18, 1928.

C. F. PYM 1,695,559

MACHINE FOR SHAPING UPPERS OVER LASTS

Filed Feb. 15, 1923 — 21 Sheets-Sheet 16

Dec. 18, 1928.　　　　　　　　　　　　　　　　1,695,559
C. F. PYM
MACHINE FOR SHAPING UPPERS OVER LASTS
Filed Feb. 15, 1923　　　　21 Sheets-Sheet 17

INVENTOR

Dec. 18, 1928.

C. F. PYM 1,695,559

MACHINE FOR SHAPING UPPERS OVER LASTS

Filed Feb. 15, 1923

INVENTOR
Charles F. Pym

Dec. 18, 1928.  
C. F. PYM  
1,695,559  
MACHINE FOR SHAPING UPPERS OVER LASTS  
Filed Feb. 15, 1923  21 Sheets-Sheet 19

INVENTOR

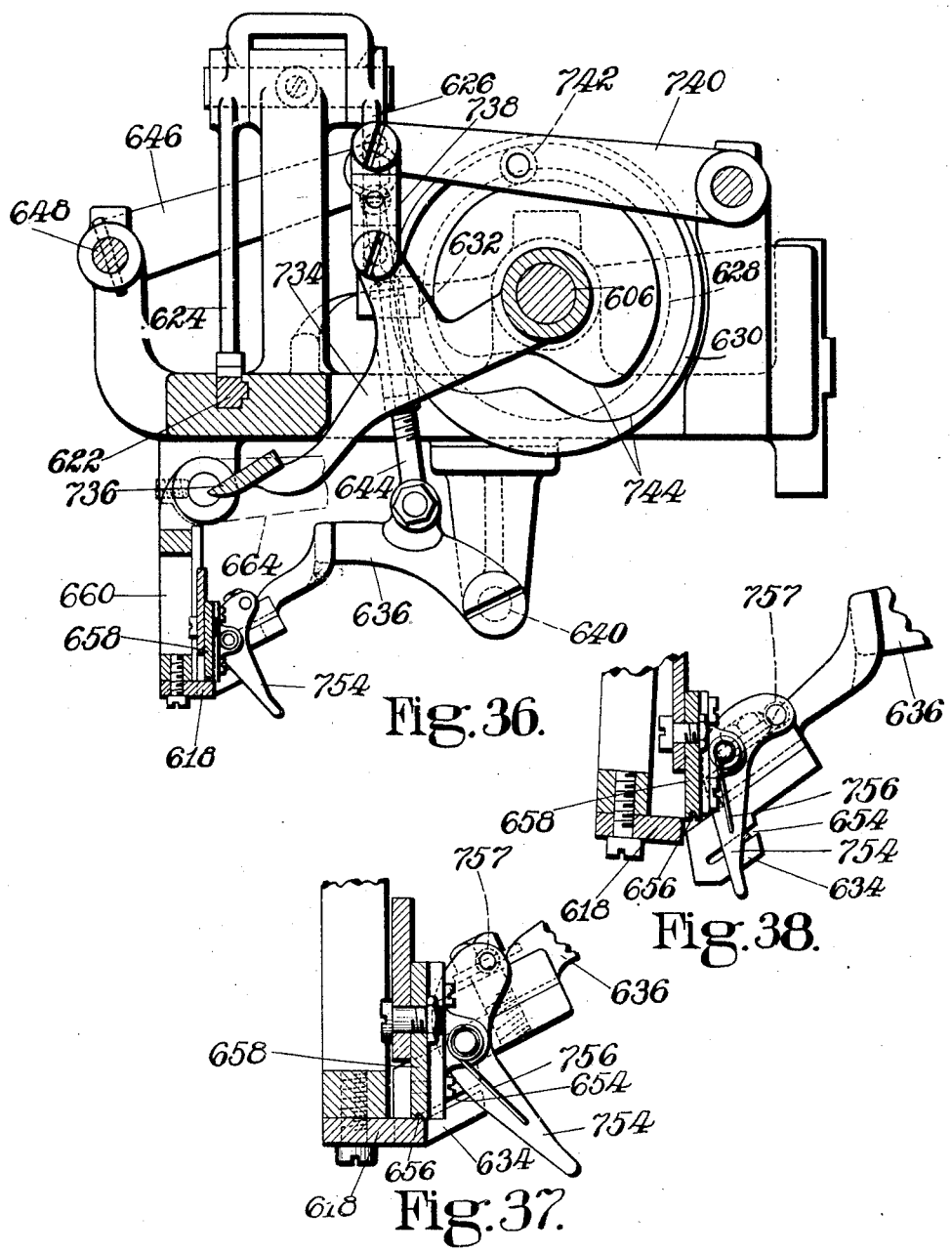

Patented Dec. 18, 1928.

1,695,559

UNITED STATES PATENT OFFICE.

CHARLES F. PYM, OF LYNN, MASSACHUSETTS, ASSIGNOR TO UNITED SHOE MACHINERY CORPORATION, OF PATERSON, NEW JERSEY, A CORPORATION OF NEW JERSEY.

MACHINE FOR SHAPING UPPERS OVER LASTS.

Application filed February 15, 1923. Serial No. 619,120.

This invention relates to machines for shaping uppers over lasts in the manufacture of boots and shoes, and is herein shown as embodied in a machine for pulling over the upper and for lasting the toe of the shoe. While it is thus in accordance with one of the important objects of the invention to provide in one organization means for performing both pulling-over and toe lasting operations, and while various important and novel features of the invention are to be recognized in a combination of pulling-over and lasting means, it will be evident that in many of its aspects the invention is not limited to such a combination, but includes novel and useful features relating, for example, more particularly to the lasting of the shoe or to the pulling-over of the upper. It will also be recognized that in some of its features the invention is not limited in respect to the part of the shoe operated upon.

One very important object that the invention has in view is to provide a machine for pulling over and for lasting the toes of shoes which will operate with results conformable to the requirements of high-class work, for example the better grades of welt shoes, without the need of any great amount of labor or any very high degree of skill on the part of the workman. In one of its important aspects the invention accordingly provides a novel organization of means for pulling over the upper and for wiping the upper heightwise of the toe and inwardly over the bottom of the last (i. e. "upwiping" and "overwiping" the upper), the machine herein shown having toe-embracing wipers and means for imparting to them automatically upwiping and overwiping movements to supplement the action of the pulling-over means in conforming the upper to the contour of the last and to work the upper into lasted position over the insole, the illustrative machine having also means for fastening the upper automatically in lasted position by the use of a toe binder.

It may be preferable on some kinds of work, for the best results in conforming the upper materials to the contour of the last and to the insole, to subject the upper to repeated wiping operations, and with this in view the machine herein shown is so organized as to repeat automatically the upwiping movement of the wipers and thereafter to repeat automatically their overwiping movement. The operating means is also organized to increase the pressure of the wipers on the upper materials in successive overwiping movements of the wipers. In these and other respects it will be recognized that the invention, in many of its aspects, is not limited to a combination of pulling-over means and lasting means, but presents various novel features in the last means per se.

The assist in conforming the upper smoothly and tightly to the contour of the last about the toe, the machine illustrated has means for pulling the upper inwardly at the sides of the toe, and for the purposes in view is further organized to pull the upper in this manner as a part of the pulling-over operation preparatory to the operation of the lasting means upon the toe. There is an important advantage in pulling the upper inwardly at the sides of the toe in preparation for the upwiping operation of the toe wipers, as herein shown, since it renders the wipers more effective in conforming the upper tightly and free from wrinkles to the peripheral contour of the last.

In toe lasting mechanism having means for supporting a toe binder adjacent to the wipers during the operation of the wipers on the shoe, as in the organization herein illustrated, it is important to prevent displacement of the binder or interference with the wiping operation by premature engagement of the binder with the upper materials, and the machine herein shown is accordingly provided with novel means for controlling the binder by gripping and holding it during the wiping operation. In the construction illustrated such control of the binder is effected by the use of a gripper which is further utilized to transfer the binder from a source of supply to the lasting mechanism.

Still other features of the invention are to be recognized in a novel construction and arrangement of wiper operating and controlling means, a novel organization of binder forming and transferring mechanism, and various details of construction and combinations of parts, as will be more fully set forth by reference to the accompanying drawings and pointed out in the claims.

In the drawings:

Fig. 6 is a section on the line 6—6 of Fig. 3 showing more in detail the means for imparting supplemental movement to one of the side grippers;

Fig. 7 is a section on the line 7—7 of Figs. 1 and 6;

Fig. 8 is a detail view of one of the parts of the mechanism for imparting supplemental upper pulling or tension relaxing movement to the toe gripper;

Fig. 9 is a detail view of one of the parts of the mechanism for releasing the toe gripper from the upper at the will of the operator;

Fig. 10 is a section on the line 10—10 of Fig. 7;

Fig. 11 is a view in front elevation of the toe gripper detached, with a portion of the front cover plate of the gripper casing broken away;

Fig. 12 is a view in side elevation of the toe gripper;

Fig. 13 shows the toe gripper in vertical section;

Fig. 14 is a detail view in vertical section of one of the pairs of corner jaws of the toe gripper and parts associated therewith.

Fig. 15 is a section on the line 15—15 of Fig. 11;

Fig. 16 is a section on the line 16—16 of Fig. 11;

Fig. 17 is a view illustrating different positions of the toe gripper jaws in the cycle of operations of the machine;

Figures 1, 41:
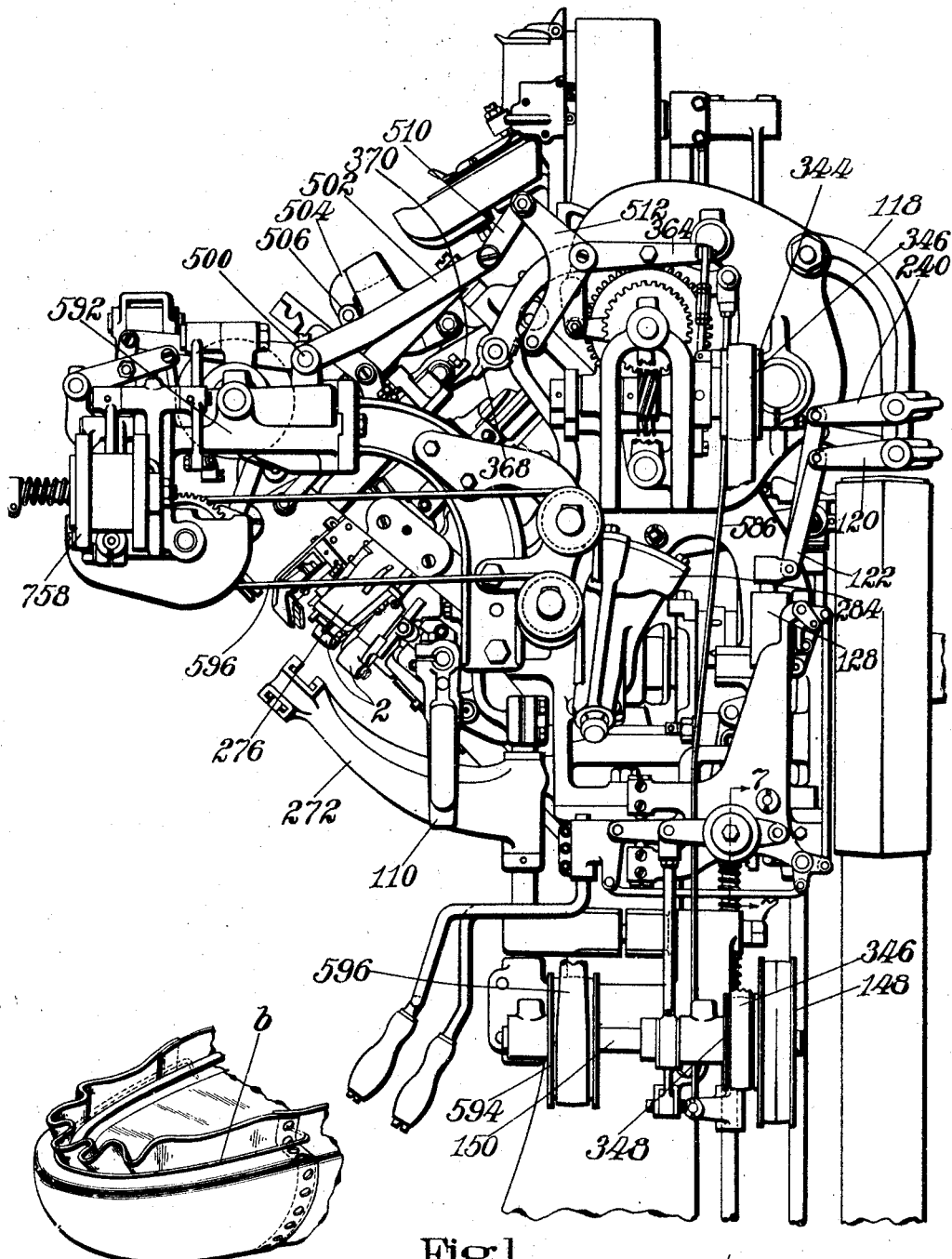
Fig. 1 is a right-hand side elevation of the head portion of a machine in which the invention is embodied.
Figure 2:
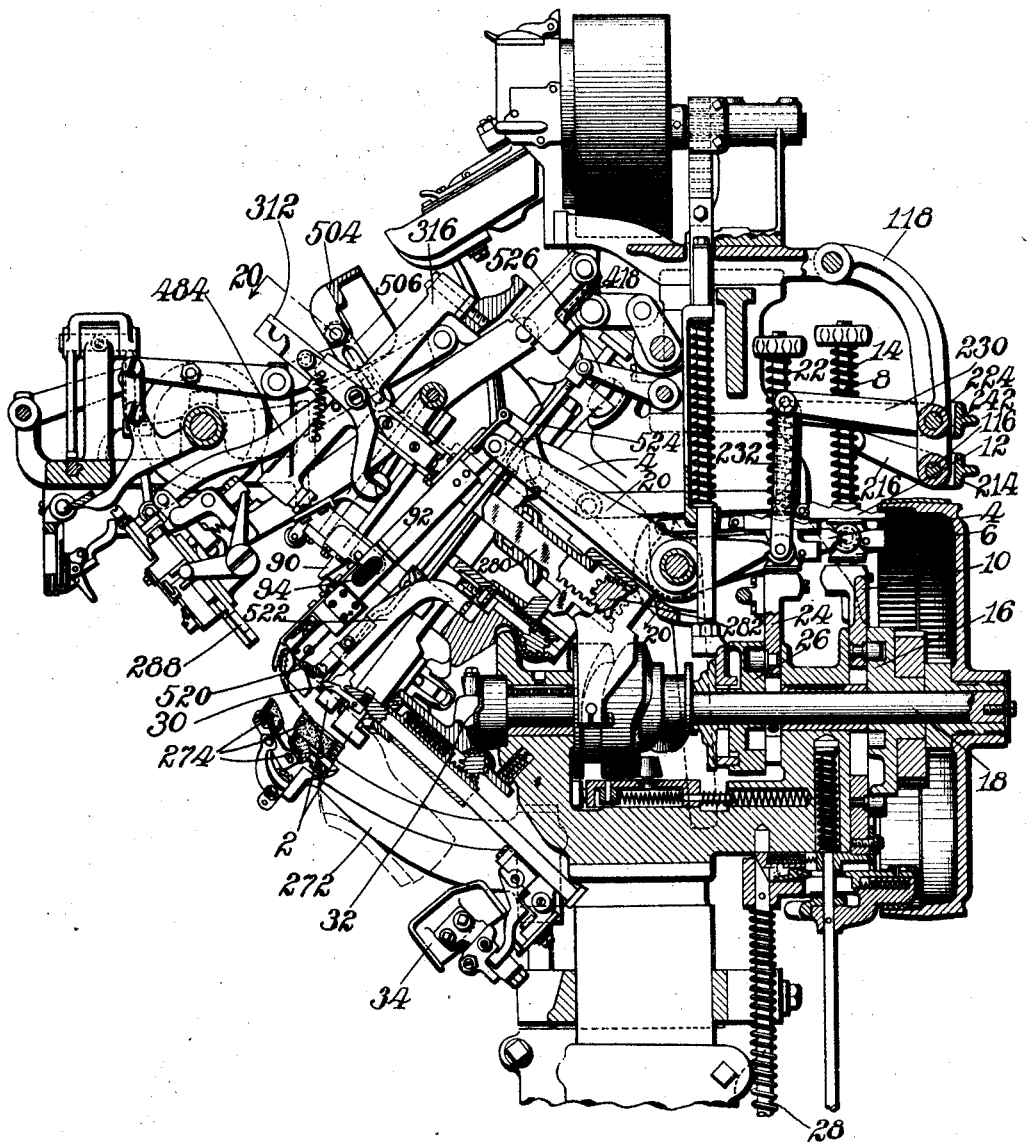
Fig. 2 is a vertical section illustrating the interior construction of parts of the machine.
Figure 35:
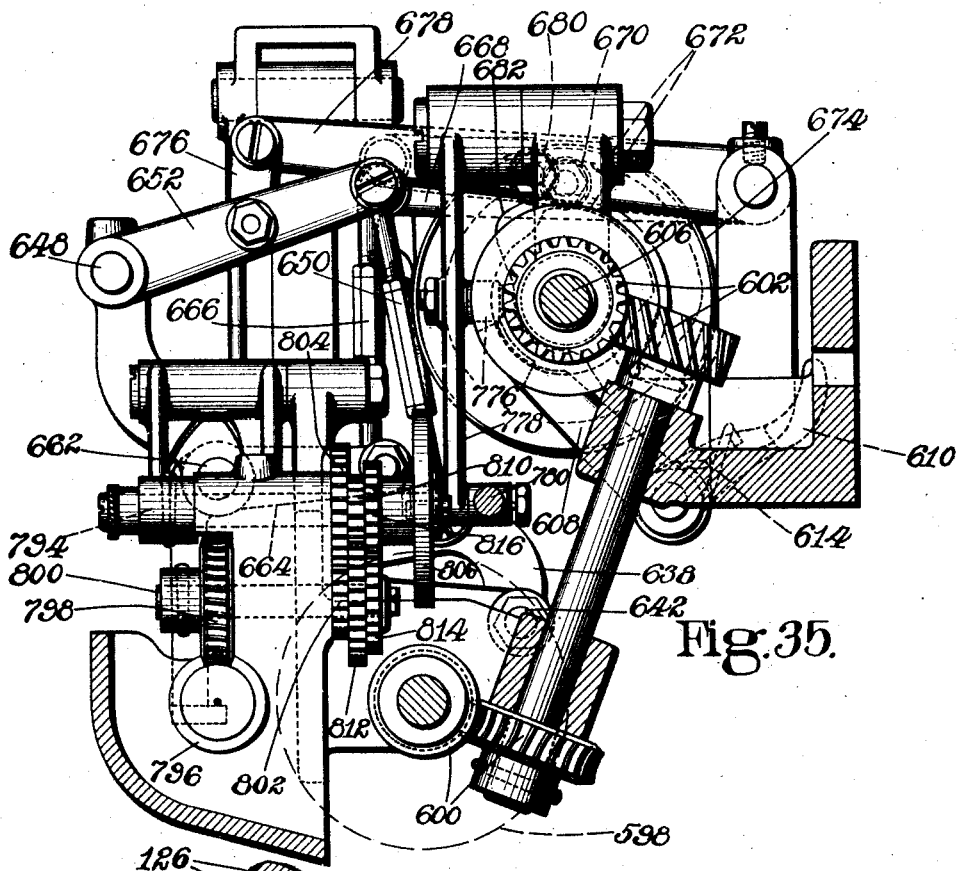
Figure 5:
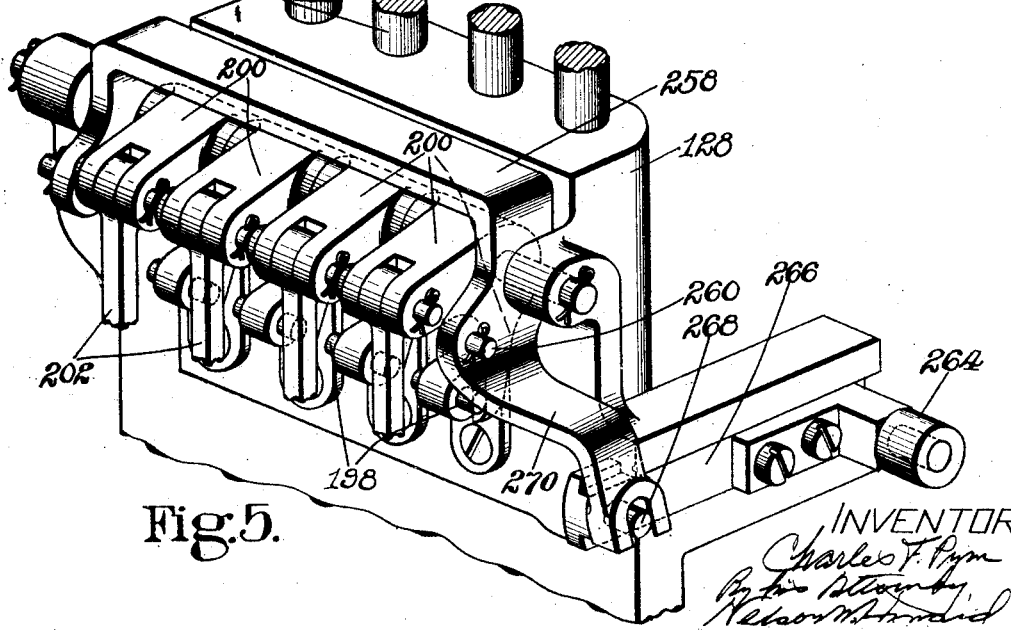
Fig. 5 is a rear perspective view of a portion of the mechanism shown in Fig. 4.
Figure 18:
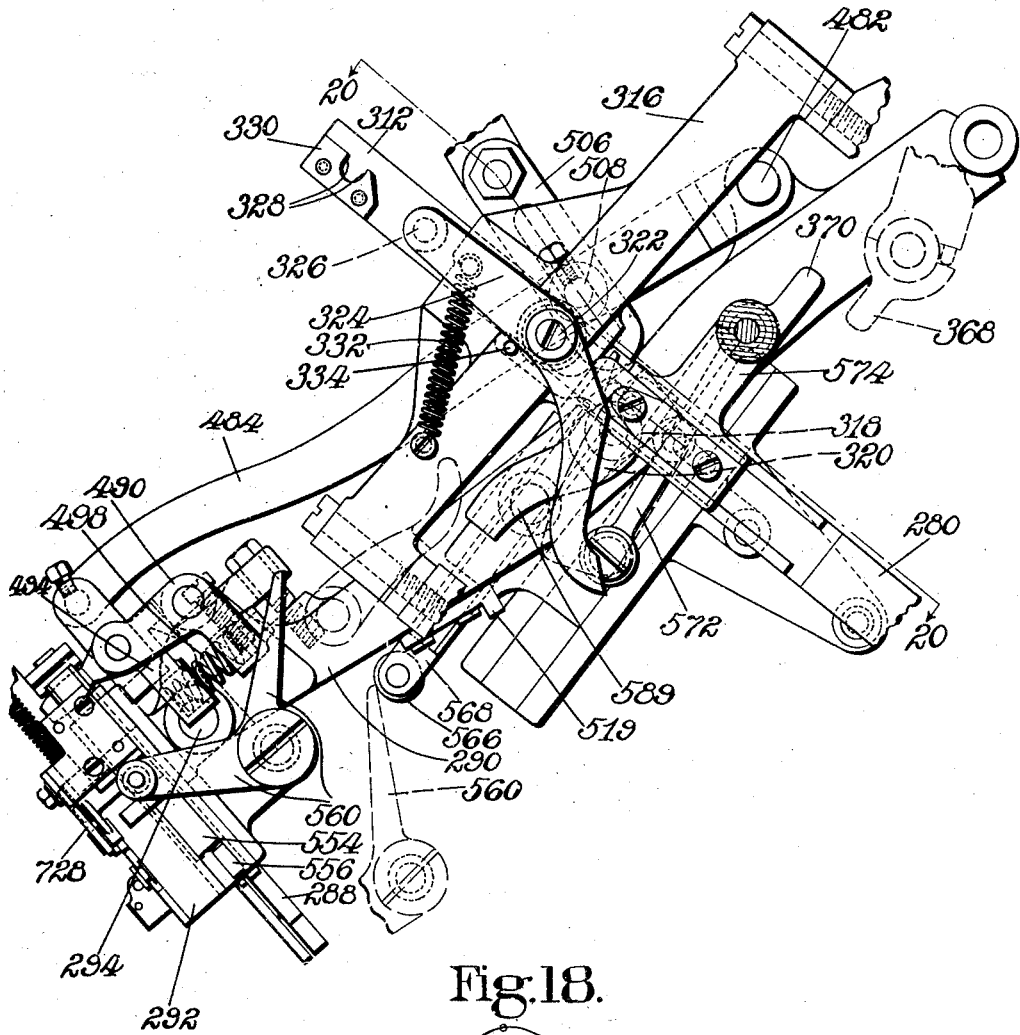
Fig. 18 is a view in side elevation, with parts broken away, showing the toe wiping and binder applying mechanisms in starting position, with portions of their operating and controlling means.
Figure 40:
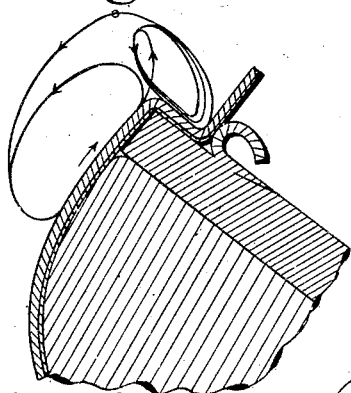
Figure 19:
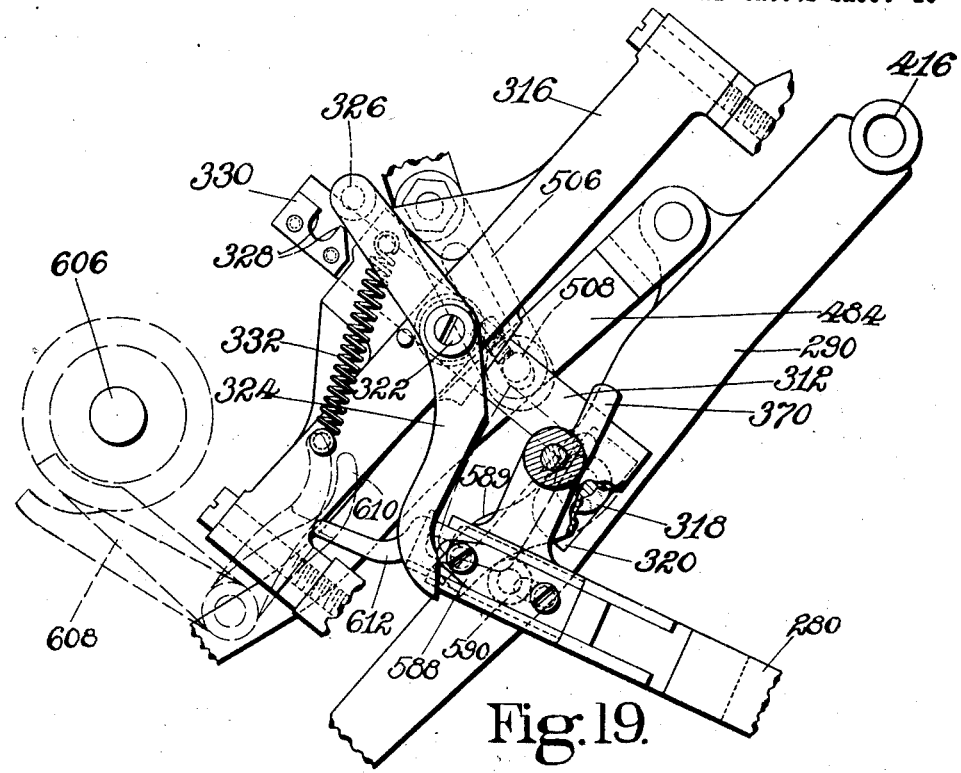
Figure 21:
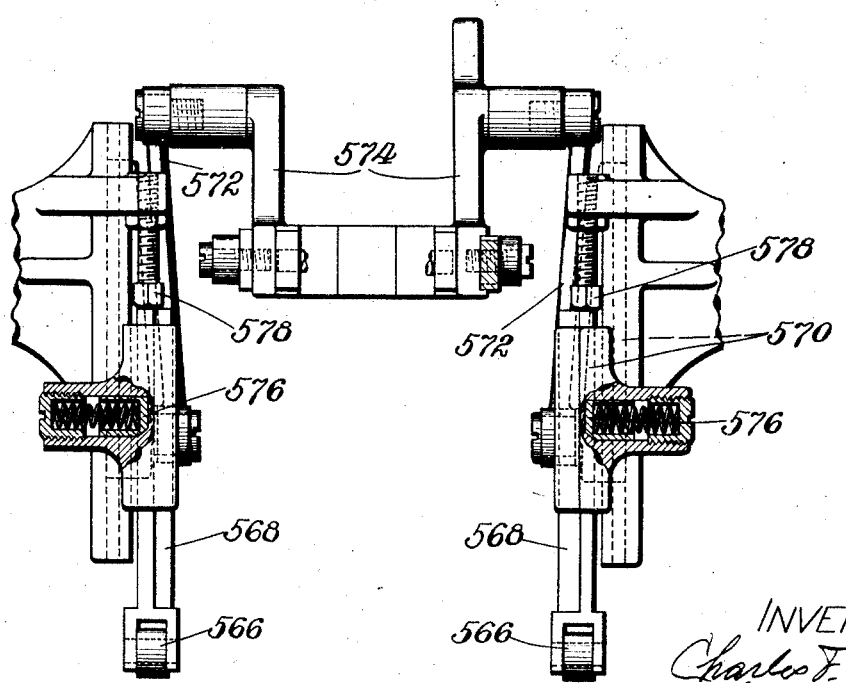
Figure 20:
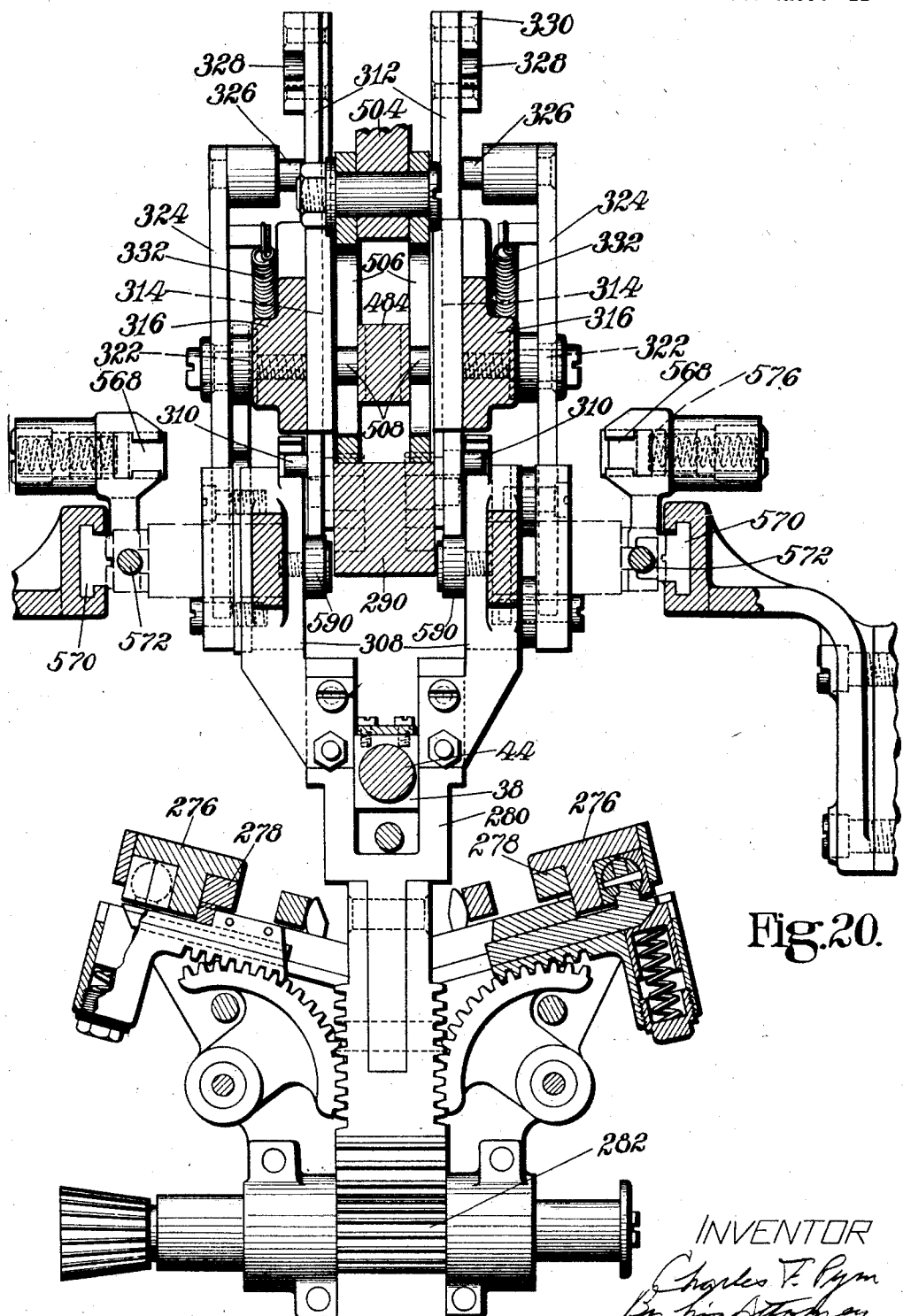
Figure 22:
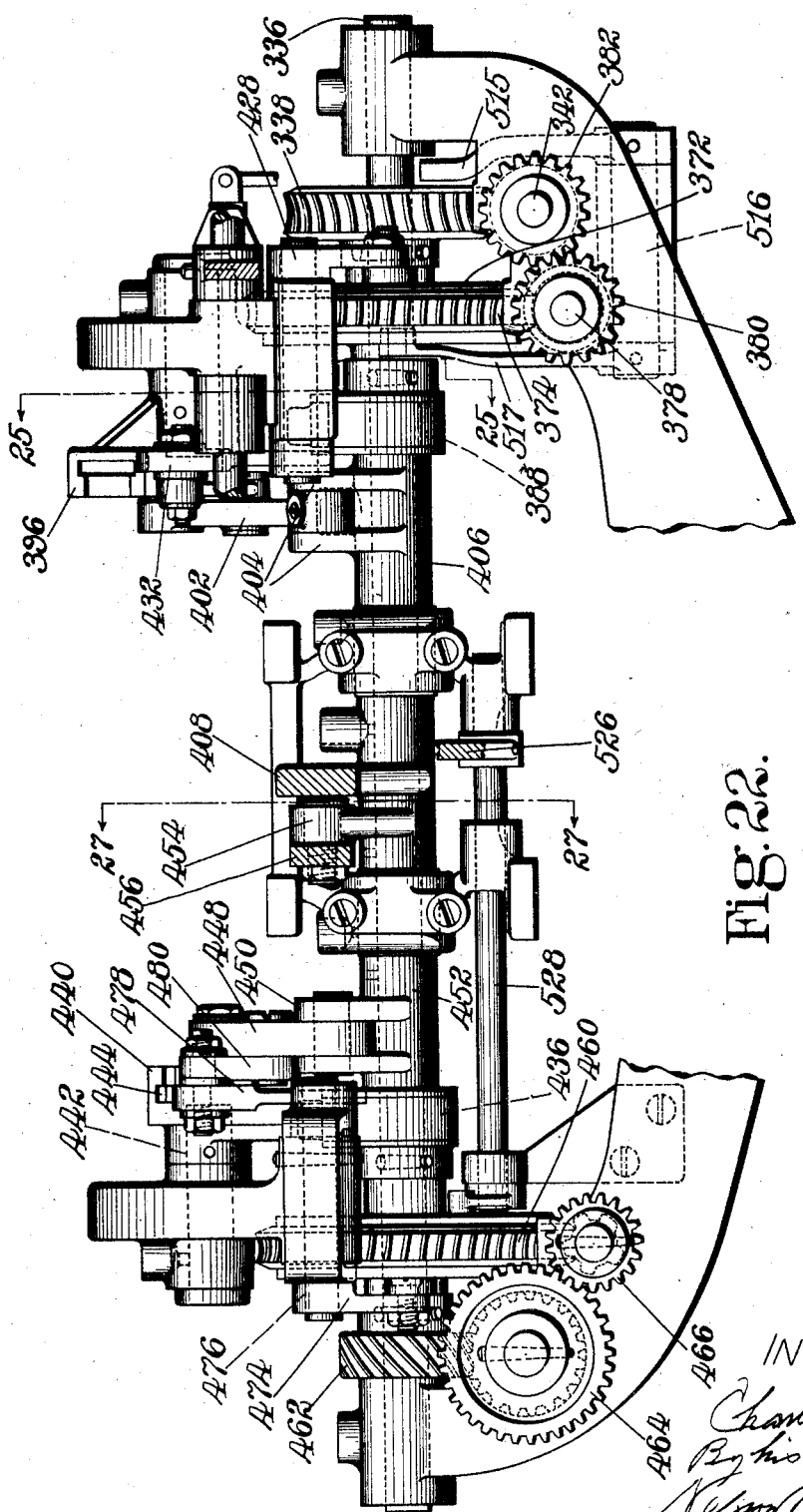
Figure 23:
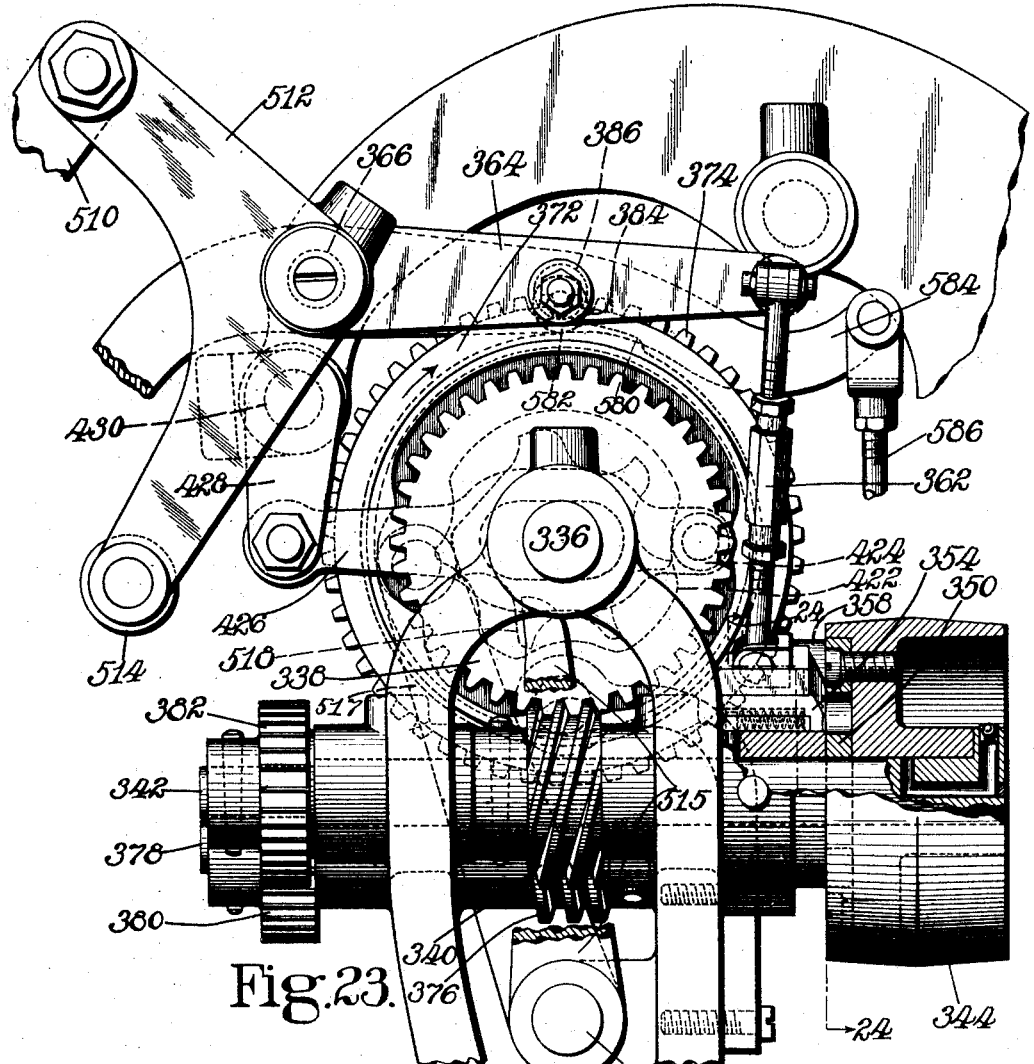
Figure 24:
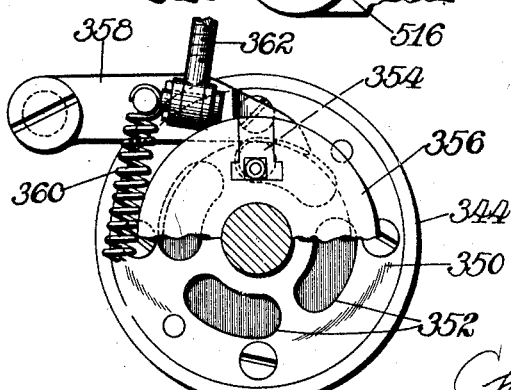
Figure 25:
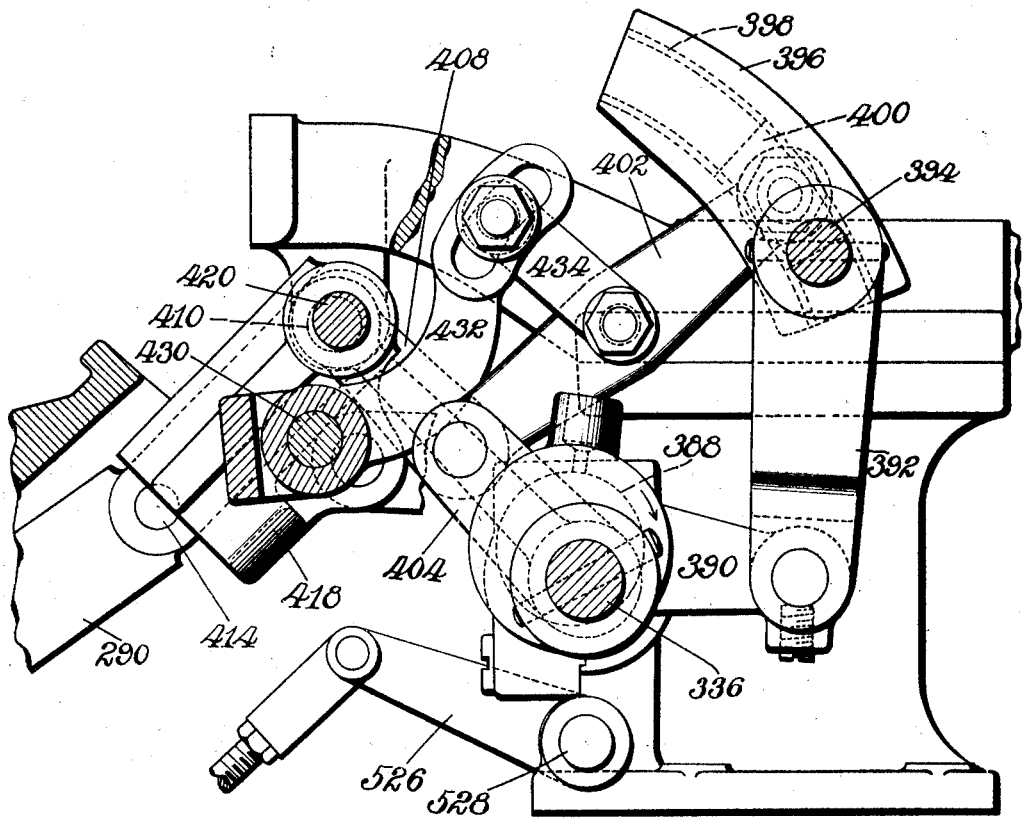
Figure 26:
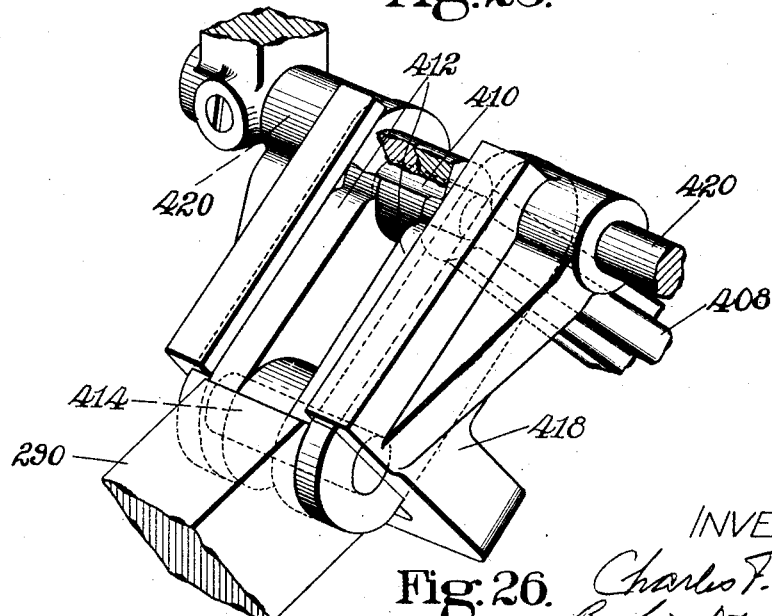
Figure 27:
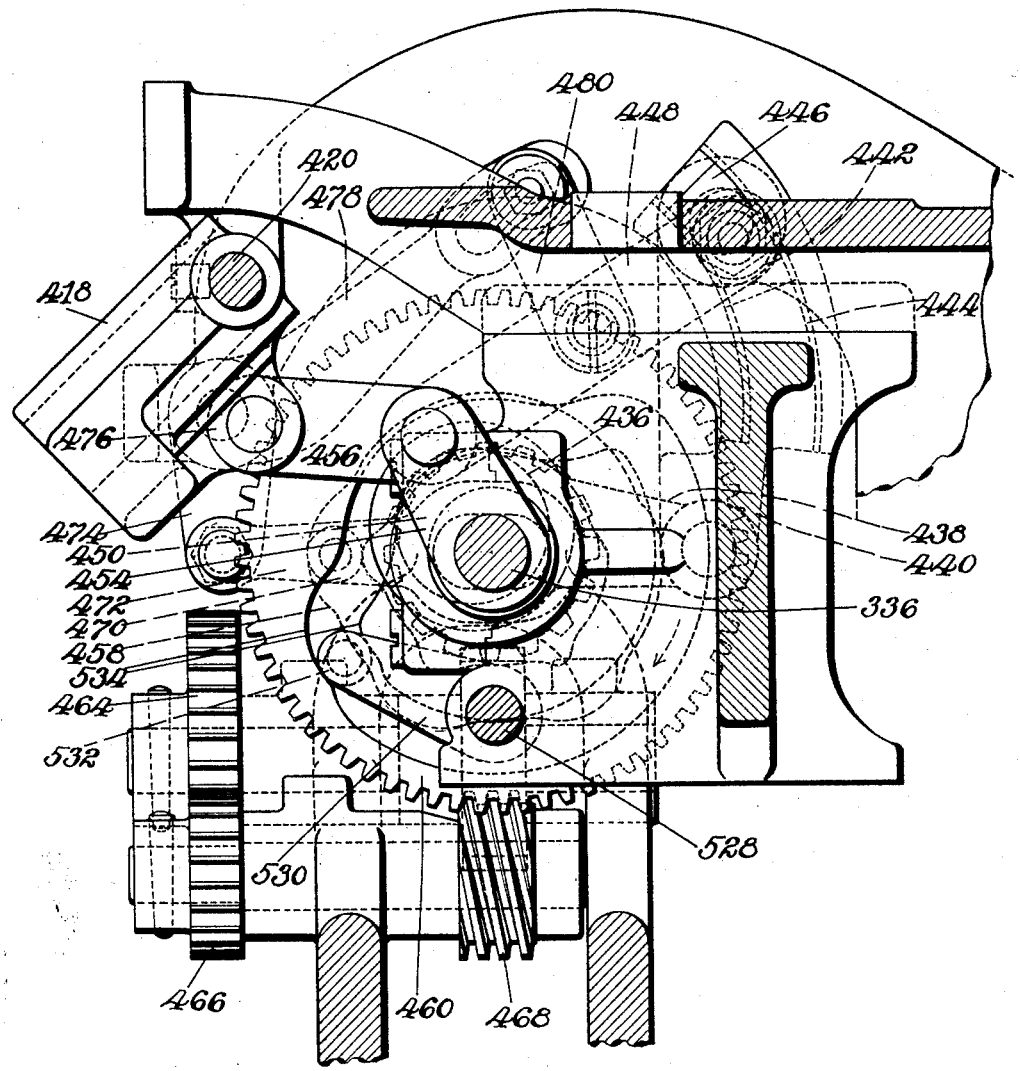
Figure 28:
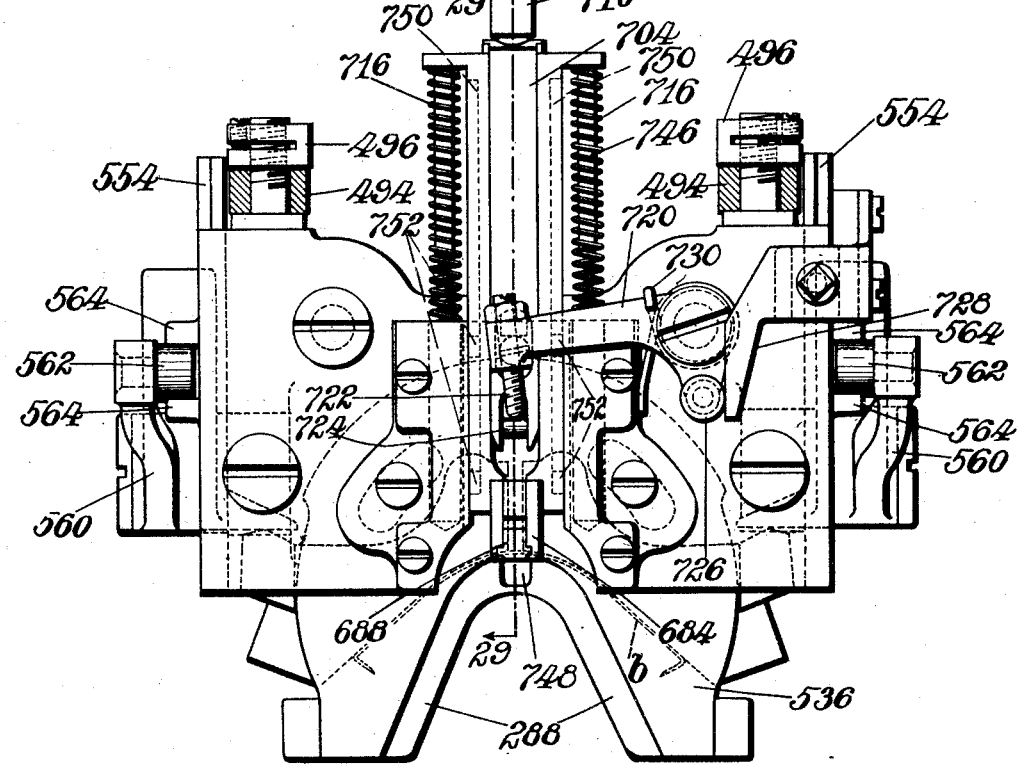
Figure 29:
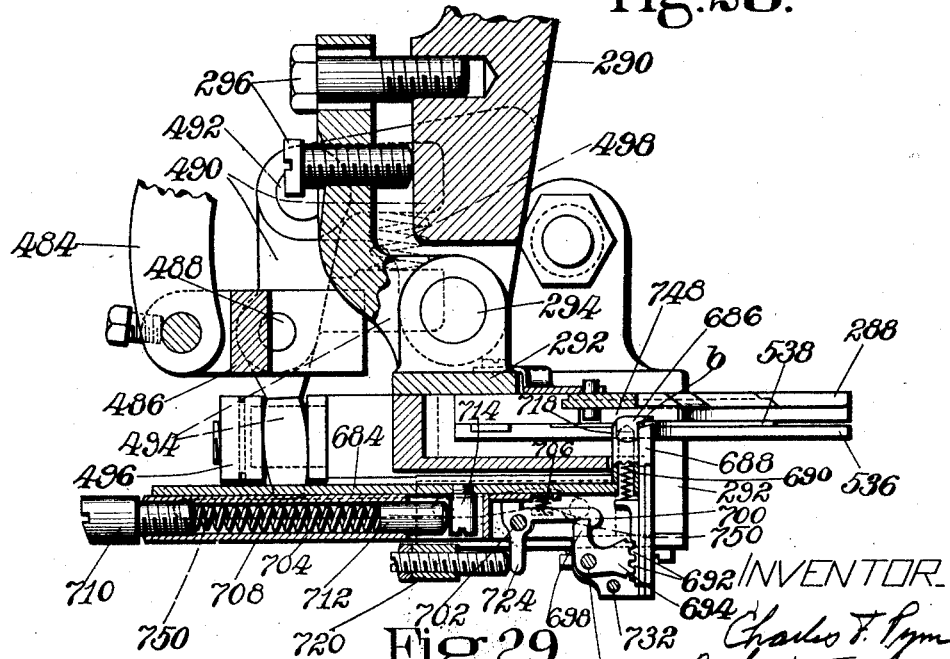
Figure 30:
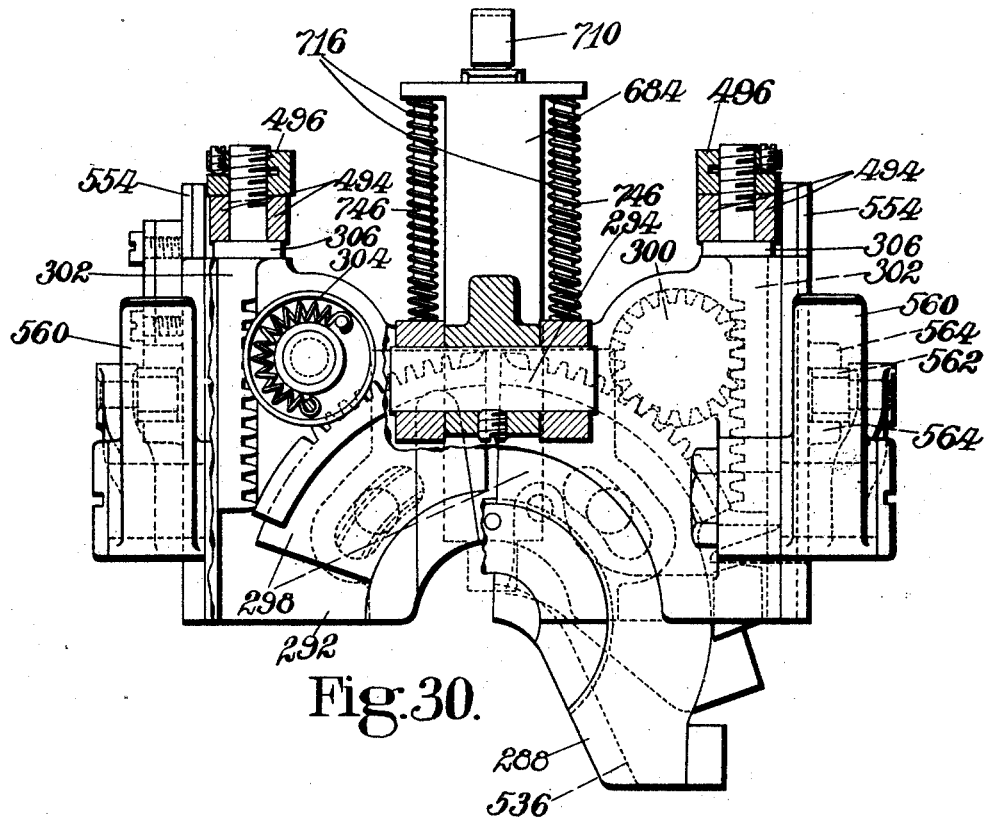
Figures 31, 32:
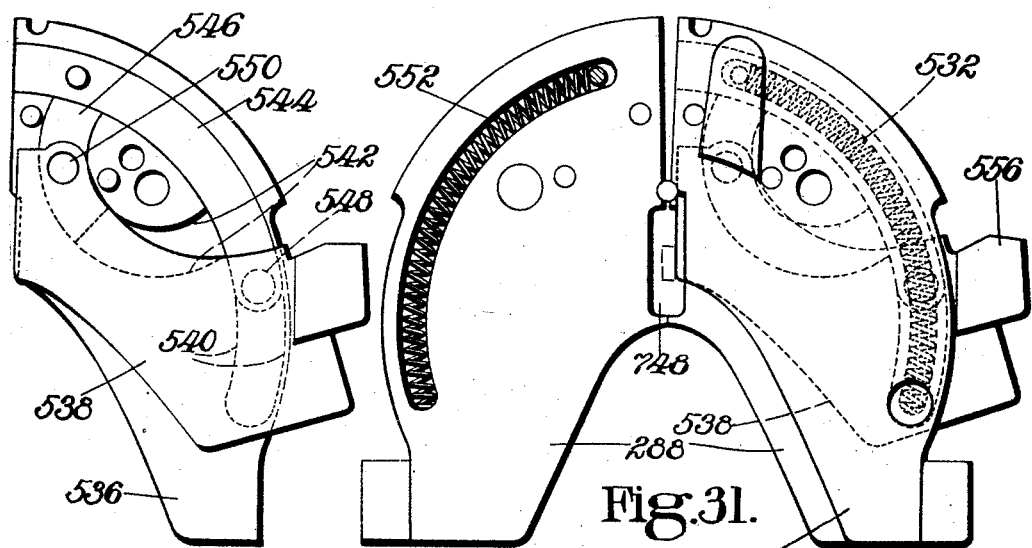
Figure 33:
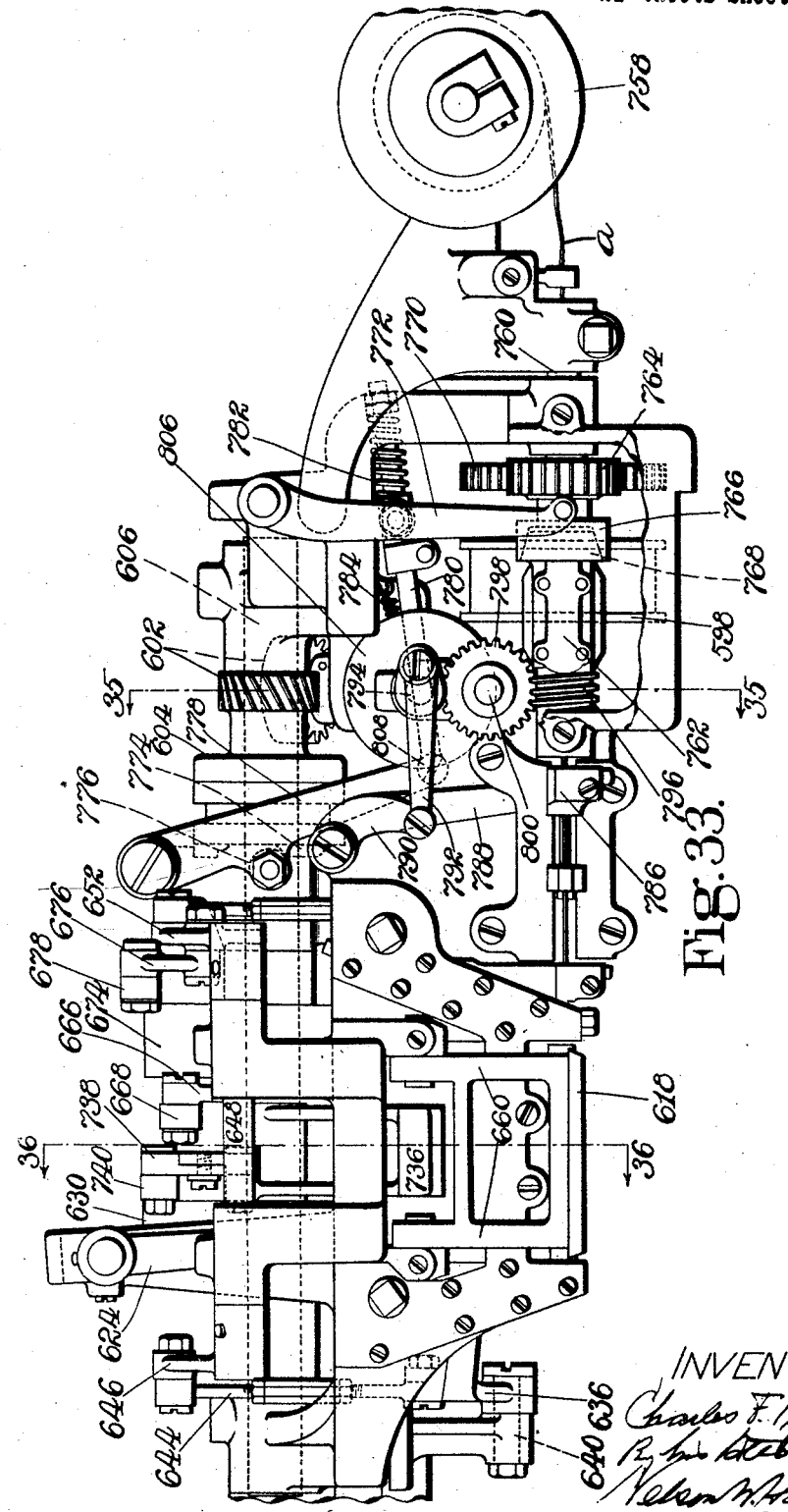
Figure 34:
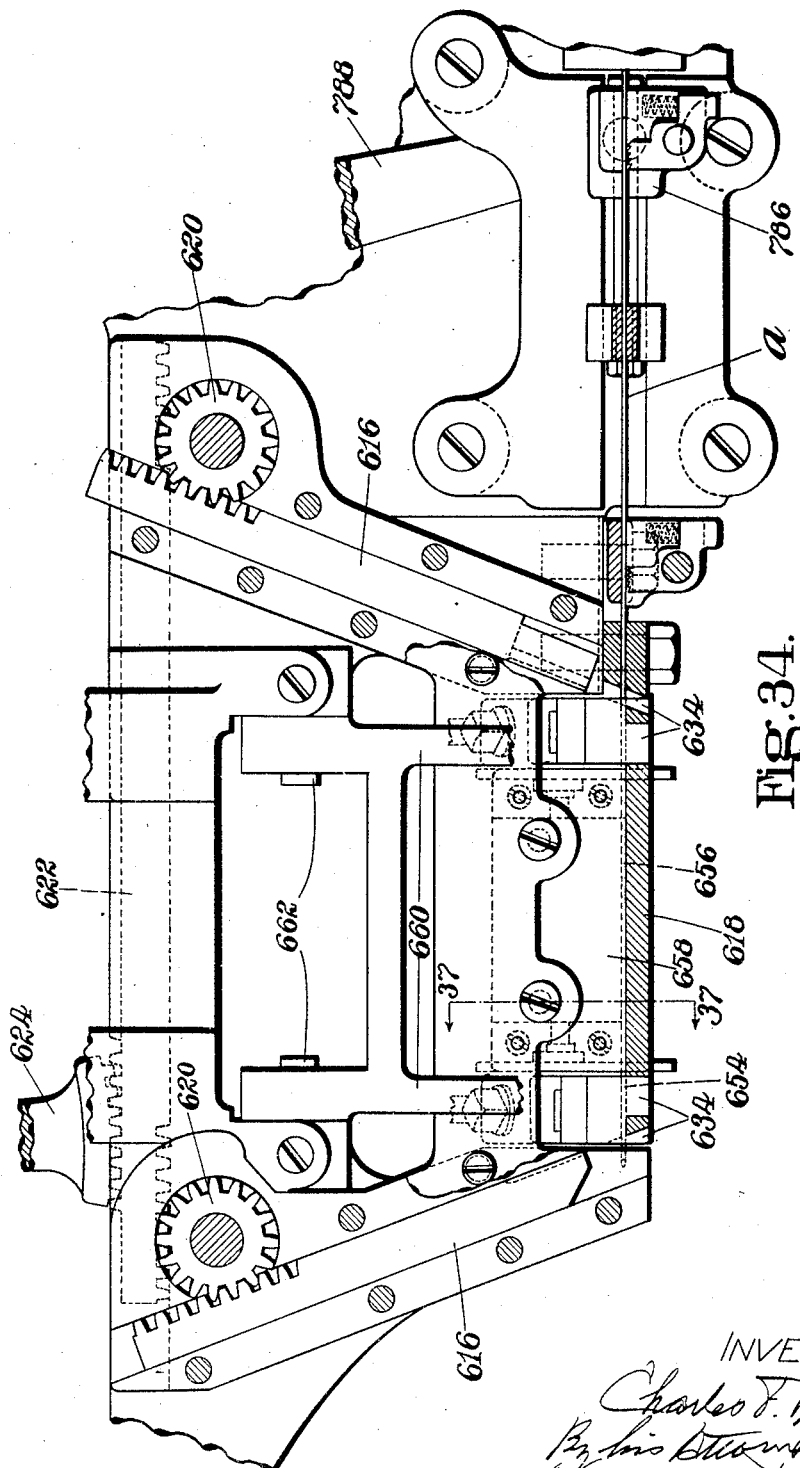
Figure 39:
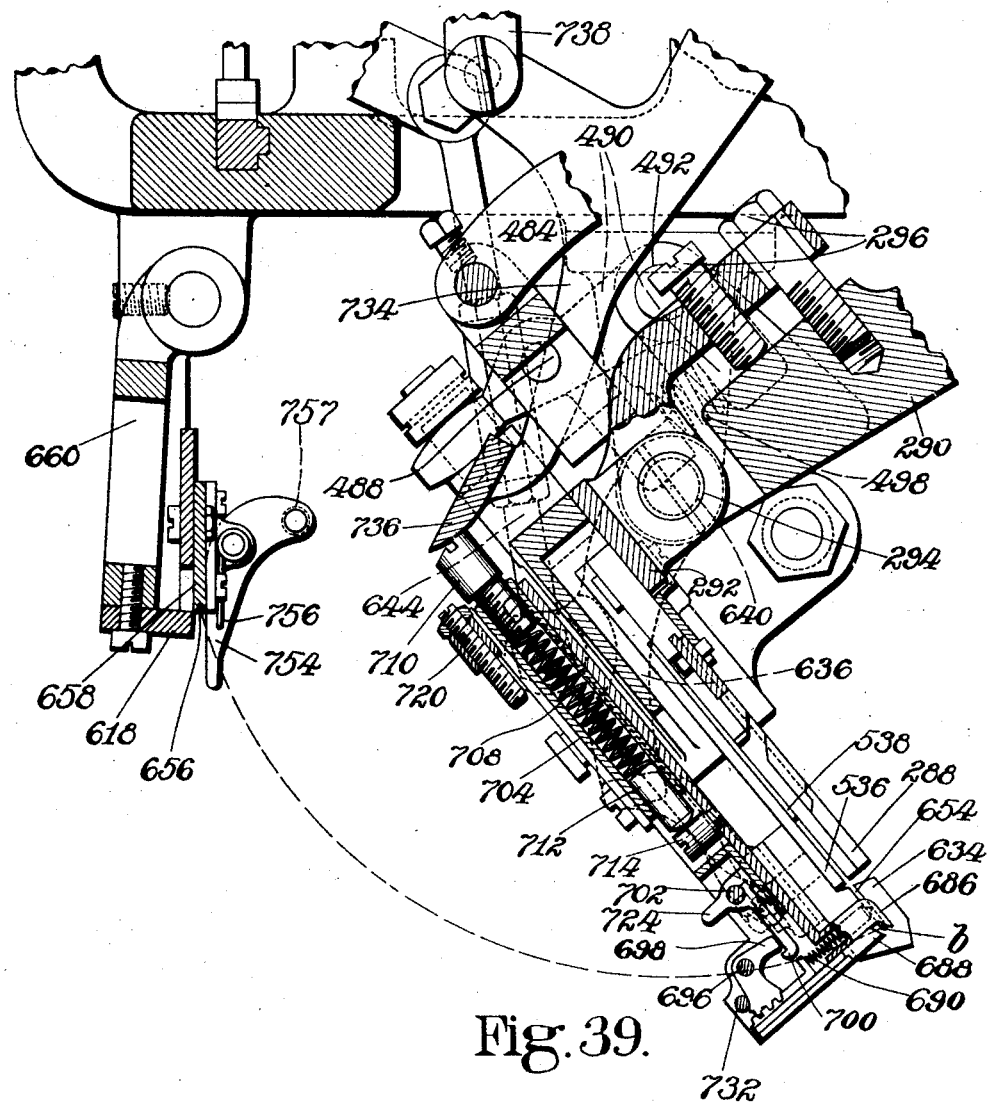

Fig. 18ª is a view similar to Fig. 18 showing the parts in their relation to a shoe and to other portions of the machine in the up-wiping operation;

Fig. 19 is a detail view of a portion of the mechanism shown in Figs. 18 and 18ª, illustrating the return of the parts to starting position;

Fig. 20 is a section on the line 20—20 of Figs. 2 and 18;

Fig. 21 is a view substantially in front elevation, with parts broken away, showing a portion of the operating and controlling means for the toe wiping and binder applying mechanisms;

Fig. 22 is a view in front elevation, with parts in section, showing mechanism near the top of the machine for imparting operative movements to the toe wipers;

Fig. 23 is a right-hand side elevation of the mechanism shown in Fig. 22, with parts broken away;

Fig. 24 is a section on the line 24—24 of Fig. 23;

Fig. 25 is a section on the line 25—25 of Fig. 22;

Fig. 26 is a front perspective view of a portion of the mechanism shown in Fig. 25;

Fig. 27 is a section on the line 27—27 of Fig. 22;

Fig. 28 is an inverted plan view of the toe wiping and binder applying mechanism;

Fig. 29 is a section on the line 29—29 of Fig. 28;

Fig. 30 is a plan view of the mechanism shown in Fig. 28, with parts broken away;

Fig. 31 is a detail inverted plan view of the toe wipers and associated parts detached with a portion of the structure at the left-hand side removed;

Fig. 32 is a view of the parts removed from Fig. 31 as they appear when inverted;

Fig. 33 is a front elevation of the binder forming and transferring mechanism;

Fig. 34 is a view on an enlarged scale, partly in front elevation and partly in vertical section, of a portion of the mechanism shown in Fig. 33;

Fig. 35 is a section on the line 35—35 of Fig. 33;

Fig. 36 is a section on the line 36—36 of Fig. 33;

Fig. 37 is an enlarged detail view of a portion of the structure shown in Fig. 36;

Fig. 38 is a view similar to Fig. 37 with the parts in a different position to illustrate how a binder may be ejected from the binder carrier;

Fig. 39 is a view of the toe wiping and binder transferring mechanisms in vertical section, illustrating the transfer of a binder;

Fig. 40 is a view illustrating diagrammatically the movements of the wipers in their operation on the shoe, and Fig. 41 is a perspective view of the toe of a shoe pulled over and lasted by the use of the machine.

The invention is herein shown as embodied in an organization including many features of a well-known type of pulling-over machine illustrated and described in detail in various prior United States Letters Patent, including Patent No. 1,029,387, granted on June 11, 1912, upon an application of R. F. McFeely, and such details of the structure of the machine herein shown as are common to well-known prior machines will, therefore, be described only in brief terms. The machine illustrated also embodies in its general organization, particularly in the toe wiping mechanism and in the means for forming, transferring and applying the binder to the shoe, features which in many respects are broadly similar to the disclosures of Patent No. 1,436,194 granted upon my application on Nov. 21, 1922, and Patent No. 1,516,499, granted upon my application on Nov. 25, 1924, to which likewise reference may be made for a better understanding of certain details of the construction.

For pulling the upper over the last the machine is provided with side grippers, comprising at each side of the forepart two pairs of gripper jaws 2, as common heretofore, and with a toe gripper the construction of which will be hereinafter more particularly set forth. The opposite side grippers are connected respectively to different updraw levers 4, one of which is shown in Fig. 2, the rear ends of these levers being swivelled in blocks 6 which are slidably mounted on updraw rods 8 fast on a vertically movable operating slide 10. Encircling the rods 8 and bearing downwardly upon the blocks 6 through tension adjusting wedges 12 are updraw springs 14 through which movement is imparted yieldingly to the updraw levers upon a downward movement of the slide 10, the slide being operated by the usual cam 16 on a cam shaft 18. The toe gripper is similarly connected to an updraw lever 20 to which movement is imparted yieldingly through an updraw spring 22 from a slide 24 operated by a cam 26 on the shaft 18. Movement is imparted to the shaft 18 intermittently in the course of the cycle of operations from a power shaft (not herein shown), under control of mechanism of the character illustrated in Letters Patent No. 791,986 granted on June 6, 1905, upon an application of R. F. McFeely, this mechnaism including a treadle operated rod 28 which is moved upwardly to start the machine at each stage of the cycle. The work is presented to the machine as illustrated in Fig. 2, with the bottom of the insole in engagement with a sole rest 30, and it will be understood that in the first stage of the cycle the grippers are operated through the mechanism above described to grip and to pull the upper, the sole rest 30 having imparted to it a short downward tipping movement by the action of a cam 32, and at the end of this stage of the cycle the machine comes automatically to a stop with the upper held under tension for the inspection of the operator and for such supplemental operations as may be necessary or desirable, for example to vary the force of the pull of one or more of the grippers or to adjust the tip line in relation to the lines of the last. In this first stage of the cycle also a heel rest 34 is moved forwardly into supporting engagement with the rear end of the shoe, this heel rest being preferably constructed as shown in Letters Patent No. 1,516,499 above mentioned.

In the machine herein illustrated, the toe gripper is constructed as shown in Figs. 11 to 16, inclusive. Similarly to grippers heretofore in use in machines of the general type illustrated, this gripper includes in its organization a gripper bar 36 connected to the updraw lever 20 and a gripper casing 38 provided with lugs 40 for engagement with a portion of the frame of the machine to limit downward movement of the casing, together with a spring 42 which is under compression between an enlarged head 44 on the gripper bar and a member 46 secured within the gripper casing and acts at the beginning of the upward movement of the bar 36 to hold the casing down and thereby to cause the gripper jaws to be closed upon the upper before they begin their upper pulling movement. In a machine having means for lasting the toe it is desirable that the upper be gripped and pulled not only at the extreme end of the toe but for a considerable distance around the toe at opposite sides of its middle portion, and for this purpose the gripper herein shown is provided with three pairs of gripper jaws, one pair for engaging the upper at the end of the toe and the other two pairs for engaging it at what may be termed the corners or the sides of the toe. The middle or end pair of gripper jaws comprises a jaw 48 which is fast on the casing 38 and a jaw 50 pivoted at 52 on the casing and provided with an inwardly curved shank portion 54 which is engaged by a pin 56 carried by a jaw closing slide 58. Each pair of corner gripper jaws comprises a jaw 60 (Fig. 14) fast on a holder 62 and a cooperating jaw 64 pivoted at 66 on said holder. Movably mounted in each of the corner jaw holders 62 is a closing slide 68 provided with pins 70 and 72 for engagement with opposite sides of the inwardly curved shank portion 74 of the jaw 64 to effect respectively closing and opening movements of said jaw. Each corner jaw holder 62 is provided with a substantially cylindrical portion 76 extending upwardly into a socket formed in the casing 38 and mounted to turn in the socket about an axis substantially parallel to the direction of the pull of the gripper. A pin 78 engaging the cylindrical extension 76 in an annular groove 80 (Fig. 14) serves to maintain the holder 62 in place while permitting it to turn as above described.

The turning of the corner jaw holders 62 in the gripper casing is under control of rack bars 82 which are slidably mounted in the casing 38 and engage teeth 84 formed on the extensions 76 of the holders, each rack bar having mounted within it a spring 86 to move it forwardly as far as permitted by a pin 88. Initially, therefore, the corner jaws are inclined outwardly from the middle jaws, as shown in full lines in Fig. 17, to facilitate inserting the margin of the upper materials in the three pairs of jaws when the work is presented to the machine. In the upper pulling movement of the gripper the outer ends of the rack bars 82 are engaged by cam blocks 90 (Figs. 2 and 18ª) which are fast on the frame of the machine and act to force the rack bars inwardly and thus to swing the corner jaws inwardly toward the sides of the toe (see the broken lines of Fig. 17), the toe gripper as a whole being guided in its upward movement by rolls 92 which engage the casing 38 in slots 94, so that the gripper pulls in a direction substantially perpendicular to the plane of the insole. Such inward swinging movement of the corner jaws serves to draw the upper close to the last about the toe in preparation for the subsequent upwiping of the upper as hereinafter described. In order to pull the upper smoothly and free from wrinkles about the entire toe the three pairs of gripper jaws are arranged to effect a substantially continuous engagement with the upper, the corner jaws, in closed position, extending along the edge of the upper from points approximately contiguous to the middle jaws, as illustrated in Fig. 17. The axes of turning movement of the corner jaw holders, moreover, are substantially coincident with the opposite ends of the fixed middle jaw 48, so that in the inward swinging movement of the corner jaws they are maintained in the same close relation to the middle jaws.

For closing the corner jaws on the upper materials the closing slides 68 have upward extensions provided with annular gear teeth 96 engaged by pinions 98, the different pinions being mounted respectively on different slides 100, and both pinions, moreover, engage annular teeth 102 formed on an upward extension of the closing slide 58 for the middle pair of jaws. As shown in Fig. 11, the upper ends of the slides 100 are recessed and provided with rack teeth engaging respectively the opposite sides of a pinion 104, this pinion being mounted on a holder 106 arranged to be connected by a spring-controlled latch 108 to the gripper bar 36, the latch being pivoted on the lower end of the bar. It will be evident that, as the parts are thus constructed and arranged, upward movement of the gripper bar 36 results in moving the holder 106 with its pinion 104 upwardly in the casing 38, the pinion acting to raise the slides 100 with their pinions 98 and thereby to impart jaw closing movement both to the closing slides 68 of the corner jaws and to the closing slide 58 of the middle jaws. It will also be evident that in response to any differences which there may be in the thickness of the upper materials at the opposite corners of the toe the slides 100 are permitted to move relatively by reason of the equalizing connection afforded by the pinion 104, and that as a result the gripping pressures of the different pairs of corner jaws are substantially equalized. It will likewise be understood that each pinion 98 serves in the manner of an equalizing connection between its corner jaw closing slide 68 and the middle jaw closing slide 58, but since the middle slide is connected to both these pinions the closing force applied to the middle jaw 50 is twice that applied to either of the pivoted corner jaws 64. The provision of means for applying thus a substantially greater degree of gripping pressure to the upper at the end of the toe than to portions of the upper engaged at the corners of the toe serves to insure that the portion of the upper which it is desired to subject to the greatest strain will be held securely without any tendency to slip in the gripper jaws.

Figure 3:
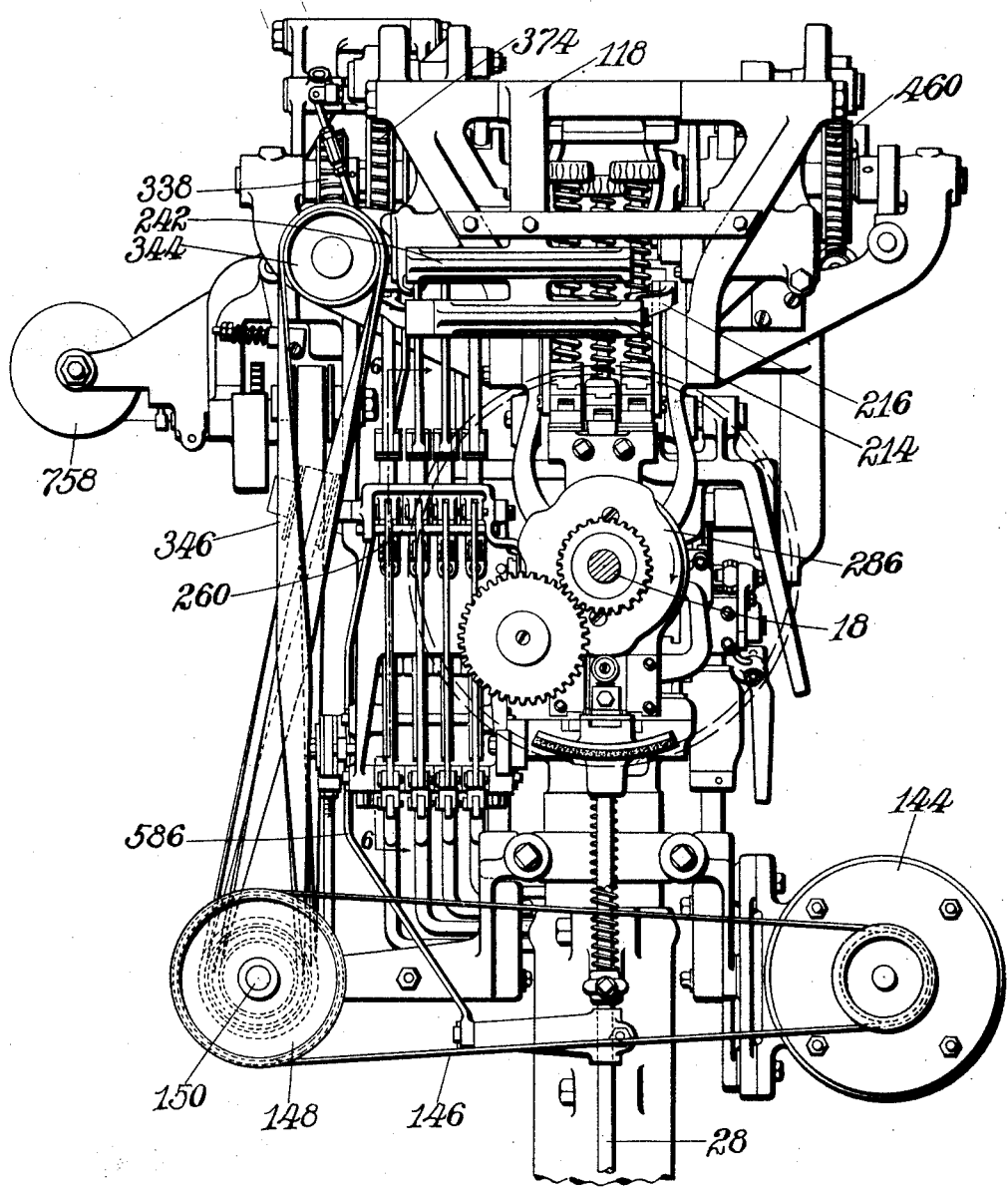
Fig. 3 is a rear elevation of the head portion of the machine with the main driving pulley removed.

After the machine has come to a stop with the upper held under tension the operator may move the opposite side grippers relatively lengthwise of the last to adjust the angular relation of the tip line to the longitudinal median line of the last by manipulation of a lever 110 (Fig. 1), as in prior machines. The conditions observed at this stage sometimes also render it desirable to move one or more of the grippers in a direction to increase or to lessen the force of the pull. For example, it may be desired to apply a harder pull through the side grippers to draw the upper closely to the last at the back of the toe, or by relaxing the force of the pull at one side and increasing it at the other side to adjust the upper by slipping it transversely of the last. At the toe, moreover, it may be desired to increase or to lessen the force of the pull, for example in order to straighten the tip line, or conditions may render it necessary to adjust the toe gripper on the upper, for example to position the gripper jaws at a higher elevation in preparation for subsequent operations. For these and other purposes, the machine is provided with power means for imparting supplemental movements to the different grippers selectively, as shown particularly in Fig. 4 of the drawings and more in detail in other figures comprising Figs. 5 to 10, inclusive, as well as in Figs. 1, 2 and 3. It will be noted that the right-hand side gripper lever 4 is connected at its rear end (Fig. 4) by a link 112 to an arm 114 which is fast on a rock shaft 116 mounted to turn in bearings in a bracket 118 on the rear of the machine, the shaft 116 having fast thereon an arm 120 connected by a link 122 to a block 124 fast on the upper end of a rod 126 which is mounted to slide vertically in a support 128 mounted on the right-hand side of the machine. Fast on the lower end of the rod 126 (Fig. 6) is a block 130 on which is pivoted at 132 a double or forked rack member 134 having opposite sets of rack teeth 136 and 138 arranged for engagement alternatively with the teeth of a pinion 140 fast on a shaft 142. Movement in the direction of the arrow may be imparted to this shaft by any convenient or suitable means, and as herein shown the shaft is driven by power derived from an electric motor 144 (Fig. 3) connected by a belt 146 to a pulley 148 which is fast on a shaft 150 mounted to turn in bearings formed in a bracket mounted on the side of the machine. The shaft 150 caries an eccentric 152 which operates a pitman 154 connected to a lever 156 mounted to oscillate on a fixed pivot 158, the lever 156 being connected by a link 160 to an arm 162 which is fast on a sleeve 164 (Fig. 10) serving as one of the members of a Horton clutch mounted on the shaft 142. Inside of the sleeve 164 is a cooperating clutch member 166 with a series of rolls 168 which act in a well-known manner to transmit movements of the sleeve 164 in the direction of the arrow to the shaft 142. It will be understood that the arm 162 is rapidly oscillated at all times through its connections to the motor 144, and that as a result intermittent turning movements all in the same direction are imparted to the pinion 140, reverse movement of the shaft 142 and its pinion being prevented by the action of a second Horton clutch 170 mounted adjacent to the driving clutch as shown in Fig. 7 and provided with an arm 172 (Fig. 10) which is fast to the frame. While it has been found convenient in the organization herein shown thus to impart intermittent turning movements to the pinion 140, it is to be understood that the utility of the mechanism is not dependent upon movement of that particular character.

By reference to Fig. 6 it will be seen that if the front series of teeth 136 on the member 134 are moved into engagement with the pinion 140, the pinion will act on these teeth through the connections above described to impart downward movement to the rear end of the right-hand gripper lever 4 to move the gripper in the direction to increase the force of its pull on the upper, and that if the rear series of teeth 138 are engaged with the pinion the opposite result will be effected and movement imparted to the gripper in the direction to relax the force of the pull. For accomplishing either of these results at will the rack member 134 is under control of handle 174 (Fig. 4) through connections including a rocker 176 mounted to turn about the axis of the shaft 142 and having projections 178 which bear respectively on the shaft and on a bushing encircling the pinion 140, and which embrace and guide between them the lower end of the rack member 134. An upward and rearward extension of the rocker 176 is provided with a roll 180 positioned in a vertical slot 182 in the rack member 134, and a forward extension of the rocker is engaged on its upper and lower faces by spring plungers 184 whereby the rocker is maintained normally in a central or neutral position with both series of rack teeth 136 and 138 out of engagement with the pinion. The handle 174 is connected to the rocker 176 by means of a block 186 which is pivoted at 188 on the forward extension of the rocker.

To understand the action of the handle 174 on the rocker 176 it is necessary to refer at this point to means provided for locking the rod 126 against return upward movement from any position to which it is moved in subjecting the upper to tension. For this purpose the rod is provided with a series of ratchet teeth 190 engaged by a complementally toothed retaining member or catch 192 pressed by springs 194 inwardly against the teeth 190. Extending outwardly from the member 192 is a rod 196 having on its outer end a head portion with a cross pin 198 engaged by one arm of a bell-crank lever 200. The other arm of the bell-crank 200 is connected by a link 202 to one arm of a bell-crank 204, and the other arm of the latter is connected by a link 206 to the block 186 which carries the handle 174. It will be seen that as the parts are positioned in Fig. 6, which is their normal or idle position, the member 192 is in engagement with the teeth on the rod 126, and consequently if an upward pull is applied to the handle 174 the block 186 is restrained by its connections to the bell-crank 200 and by engagement of the latter with the member 128 from turning about its pivot 188, so that by upward movement of the handle the forwardly extending arm of the rocker 176 is lifted against the resistance of the upper spring plunger 184 and the roll 180 acts to impart rearward swinging movement to the rack member 134 to carry the teeth 136 into engagement with the pinion 140. The pinion then acts to impart downward movement to the rack member and to the rod 126 and thereby to move the right-hand side gripper positively in the direction to increase the force of its pull on the upper, the length of such supplemental movement depending upon how long the operator continues the upward pull on the handle. It will also be evident that the locking member 192 acts automatically to lock the gripper against return movement and to hold it locked after the operator permits the rocker 176 to return to its initial position. If it should be desired for any reason to move the gripper in the direction to lessen the force of the pull, either before or after it has received such supplemental pulling movement, the operator bears downwardly on the handle 174. In view of the fact that the springs 194 are weaker than the spring that controls the lower plunger 184, the first effect of such downward pressure on the handle is to turn the member 186 about its pivot 188 and thereby through the connections above described to withdraw the catch 192 from engagement with the teeth 190. Further downward pressure on the handle then serves to swing the rocker 176 in the direction to bring the teeth 138 into engagement with the pinion 140, whereupon the pinion acts to impart upward movement to the rod 126 and thereby to move the gripper positively downward to relax the force of the pull as determined by the length of time the operator holds the handle depressed. When the operator releases the handle the member 192 returns to its locking position, and incidentally it may be observed that since this member is in locking position at the time when the grippers receive their main upper pulling movement as hereinbefore described, resulting of course in downward movement of the rod 126 and of the member 134, it acts to lock its gripper against return movement at that time in the cycle as well as against return from any position to which it may be moved by the supplemental pulling means. In order to prevent danger of breakage in case the operator should maintain the upward pull or downward pressure on the handle 174 too long, the machine is provided with a pin 208 which is arranged for engagement with one or the other of a pair of cam faces 210 formed in a recess in the rack member 134 to throw this member out of engagement with the pinion before it is moved too far in either direction.

Figure 4:
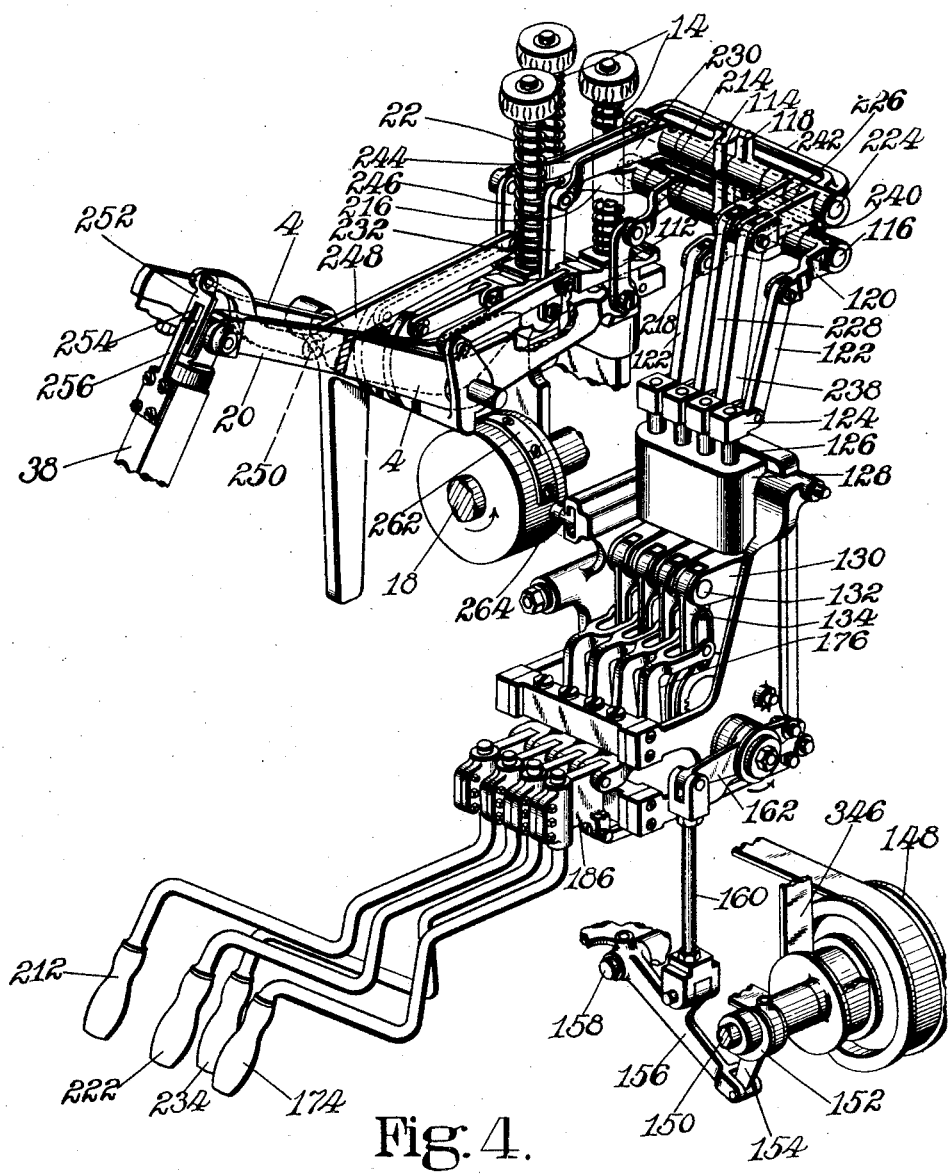
Fig. 4 is a perspective view of means provided for supplementary operating and controlling the grippers.

Mechanism which is substantially a duplicate of that above described is provided for controlling the left-hand side gripper, this mechanism including a handle 212 which is the left-hand one of the series of handles shown in Fig. 4. It is to be noted, however, that the connections to the left-hand gripper lever 4 comprise a yoke member 214 which is mounted to turn on the shaft 116, this yoke member having at one end an arm 216 connected by a link to the gripper lever and at its other end an arm 218 connected to the corresponding link 122.

Mechanism which is substantially a duplicate of that associated with each of the side gripper levers is provided for imparting also to the toe gripper lever movement in a direction to increase the force of the pull or in the opposite direction, this mechanism including a locking device, of the same construction and mode of operation as that shown in Fig. 6, for holding the toe gripper from retractive movement, and including also a rack member 220 (Fig. 8) which is substantially like the rack member 134 (Fig. 6) except for a slight mechanical difference in the shape of the recess provided for preventing excessive movement of the gripper. The supplemental movements of the toe gripper are controlled by a handle 222, and it may also be noted that the connections between the gripper lever and the corresponding rod 126 comprise a rock shaft 224 which is mounted in the bracket 118 and has thereon an arm 226 connected by a link 228 to the rod 126 and an arm 230 connected by a link 232 to the rear end of the toe gripper lever 20.

In addition to the means provided for imparting supplemental upper pulling or tension relaxing movement to the toe gripper, the machine is also provided with mechanism whereby, through power derived from the pinion 140, the toe gripper jaws may be caused to relax their grip on the upper, for example to permit the upper to slip more or less in the jaws if it should be desired to position the jaws farther from the plane of the insole, or it may be to cause the jaws entirely to release the upper. This mechanism is controlled by a fourth handle 234 and is substantially a duplicate of the mechanism illustrated in Fig. 6, including the locking device, except that, as a matter of design, the rack member is shaped as shown at 236 in Fig. 9. The corresponding rod 126 of this mechanism is connected by a link 238 to an arm 240 which is part of a yoke member 242 pivoted on the shaft 224, the yoke member having another arm 244 connected by a link 246 to a lever 248 which is pivoted at 250 on the toe gripper updraw lever 20. At its front end the lever 248 is pivotally connected to a short plate 252 in which is formed a rectangular recess 254 to receive the rearwardly curved end of a finger 256 fastened to the upper end of the toe gripper casing 38. It will be understood from the description before given of the construction of the toe gripper that an upward movement of the gripper casing 38 relatively to the gripper bar 36 will serve to relieve the pull of the latch 108 on the gripper jaw closing devices, thereby permitting the upper to slip in the jaws, or if the casing is lifted far enough, will cause the jaws to open and release the upper. It will be evident that such upward movement will be imparted to the gripper casing by the action of the plate 252 on the finger 256, through the action of the pinion 140, when the rack member 236 is engaged with the pinion by lifting the handle 234, and that the associated locking device will hold the gripper releasing connections against retractive movement until the operator depresses the handle, which he will do when he desires to restore the gripper releasing connections to their original position. If desired, by manipulation of both the handles 222 and 234 the operator may cause the toe gripper to open and to move down and grip the upper nearer to the insole and thereafter to pull the upper again as hard as may be desired. The slot 254 in the plate 252 is sufficiently elongated not to interfere with the normal relative movements of the gripper bar and the gripper casing in closing and opening the gripper jaws.

It will be evident that in the return of the parts of the machine to starting position after the operations on the shoe have been completed the upward movement of the rear ends of the gripper levers in response to the return upward movement of the slides 10 and 24 serves through the connections described to impart upward movement to the rods 126 which are associated with the different levers and thus to restore the supplemental gripper operating mechanisms to their original positions. In order to permit such return of the parts, the machine is provided with means for automatically withdrawing the locking members 192 from engagement with the teeth 190, this means comprising a yoke shaped member 258 (Figs. 5 and 6) which is pivotally mounted at the rear of the member 128 and carries a rod 260 in position to engage the rearwardly extending arms of the different bell-crank levers 200. The member 258 is operated by a cam 262 (Fig. 4) on the cam shaft 18 through engagement of the cam with a roll 264 on a slide 266, the slide having a pin 268 which engages the lower forked end of an arm 270 projecting downwardly from the member 258. It will be understood that the cam 262 moves the slide 266 rearwardly and thereby operates the rod 260 to turn the bell-crank levers 200 and withdraw the locking members 192 from engagement with the different respective rods 126, this operation occurring in proper time relation to the return movement of the gripper levers. Before the cam shaft 18 arrives at the end of its cycle the cam 262 releases the roll 264, permitting the springs 194 to return the locking members to operative position ready for the operation of the machine upon the next shoe.

After adjusting the upper on the last and effecting by the action of the supplemental gripper controlling means such relative movements of the grippers as appear to be necessary, the operator again starts the machine by upward movement of the treadle rod 28. Side clamp arms 272 are thereupon swung inwardly toward the shoe to carry shoe engaging members 274 into position to clamp and support the forepart of the shoe, as in prior machines. In this stage of the cycle also, in the present machine, inward swinging movement is imparted to side arms 276 which are associated with the opposite side grippers and which carry devices for overwiping and tacking the margin of the margin of the upper at the opposite sides of the forepart at the rear of the toe, the side grippers also being swung inwardly and tripped to cause them to release the upper in time relation to the overwiping and tacking operations. The means for operating and controlling the side arms 276 with their wipers and tackers and for tripping the side grippers may be and is herein shown as of the same construction as common heretofore in machines of the general type illustrated, and such mechanism, therefore, need not be described in detail. For a better understanding, however, of other portions of the machine, it may be stated that the inward movement of the side arms 276 and the release of their tack driver bars 278 (Fig. 20) are effected in response to rearward or inward movement of a controlling slide 280 (Figs. 2 and 20) provided with rack teeth engaged by a pinion 282, this pinion being turned to impart rearward movement to the slide 280 by the action of rack and pinion mechanism including a swinging lever arm 284 (Fig. 1) which is operated by a cam on the shaft 18. As distinguished from machines as commonly constructed heretofore, the stopping cam 286 (Fig. 3) of the machine herein shown is so designed as to bring the cam shaft 18 automatically to a stop at the end of the inward movement of the slide 280 immediately after the upper fastening tacks have been driven at the sides of the forepart of the shoe, and it is during this second pause in the cycle of the cam shaft 18 that operative movements are imparted to the mechanism for lasting the toe of the shoe, the major portion of the toe lasting operation being completed before the shaft 18 is again started.

For lasting the toe the machine is provided with toe-embracing wipers 288 which are carried by a front arm 290, this arm being pivotally supported at its upper end, as will be more particularly described, for swinging movements toward and from the toe of the shoe. The wipers 288 are supported in a wiper holder 292 which is mounted on a pivot stud 294 on the lower end of the arm 290 so that the wipers may be tipped lengthwise of the shoe to adjust them in proper relation to the plane of the insole, the wiper holder being held in adjusted position by screws 296 the action of which will be obvious upon reference to Fig. 29. The wipers 288 are detachably secured to gear segments 298 (Fig. 30) which are slidably mounted in an arc-shaped guideway in the wiper holder so that the wipers swing about an axis located substantially at the meeting point of their wiping edges. The teeth of the segments 298 are engaged by pinions 300 which are rotatably mounted in the wiper holder and are engaged in turn by rack bars 302. Each of the pinions 300 has associated therewith a spring 304 one end of which is connected to the pinion and the other end to a pin on the wiper holder so that the springs tend to maintain the wipers in their open position with the rack bars 302 at their inner limits of movement determined by engagement of shoulders 306 on the rack bars, with the outer end face of the wiper holder. It will be evident that as the parts are thus constructed inward swinging movements will be imparted to the wipers in response to outward movements of the rack bars 302 relatively to the wiper holder. The means for operating these rack bars to effect the closing movements of the wipers in proper time relation to other operations will be hereinafter more particularly described.

Before the wipers begin their operation on the toe they are swung inwardly toward the toe. Movement of the wipers to this position is effected by swinging the front arm 290 inwardly through the inward movement of the slide 280 whereby the side overwiping and tacking operations are effected as above explained. For this purpose the slide 280 has fast on its front end a pair of plates 308 (Fig. 20) the front ends of which are slotted transversely for engagement with pins 310 on slides 312 which are movable in guideways 314 formed in members 316 secured to the frame of the machine, the guideways extending in substantially parallel relation to the direction of inward movement of the slide 280. The slides 312 are connected to the front arm 290 by rolls 318 (Fig. 19) which are carried by the slides and extend into recesses 320 formed in opposite sides of the front arm and extending for a considerable distance lengthwise of the arm to permit lengthwise movements of the latter relatively to the slides 312. Through these connections the slide 280 in its inward movement imparts inward swinging movement to the front arm and its wipers. At the end of such inward movement the slides 312 are locked automatically in order to maintain the rolls 318 in fixed locations during the operations of the wipers upon the shoe. For this purpose there are pivoted at 322 on the members 316 a pair of arms 324 provided with pins 326 which are arranged to enter slots 328 formed in plates 330 secured to the front ends of the slides. The arms 324 are maintained initially by springs 332 in engagement with stops 334, so that the pins 326 ride over the sloping edge faces of the plates 330 and snap into the slots 328 when the slides 312 receive their rearward movement.

The movements of the wipers in working the upper into lasted position about the toe include a combination of movements heightwise of the shoe and movements lengthwise of the shoe. The movements of the wipers heightwise of the shoe are effected by lengthwise or up-and-down movements of the front arm 290 relatively to the rolls 318 which act as guides for the arm, and the movements lengthwise of the shoe are effected by swinging the arm about the axes of these rolls, the latter acting as a fulcrum for the arm. The arm 290 is controlled and is moved in these different ways in the lasting operation by mechanism which is connected to the upper end of the arm and is operated independently of the cam shaft 18 by connections to the electric motor 144. This mechanism is shown comprehensively in Fig. 22, and comprises a group of devices shown at the right-hand side of that figure (and more in detail in Fig. 25) for imparting to the arm its lengthwise or up-and-down movements, and a group of devices shown at the left-hand side of the figure (and more in detail in Fig. 27) for imparting to the arm its swinging movements. Included in this mechanism is a main shaft 336 which has fast thereon a worm gear 338 engaged by a worm 340 (Fig. 23) fast on a cross-shaft 342. On one end of the shaft 342 is a pulley 344 connected by a belt 346 (Fig. 3) to a pulley 348 on the motor-driven shaft 150. The pulley 344 turns idly on the shaft 342 except when connected thereto by a clutch, herein shown as a pin clutch, comprising a plate 350 (Fig. 24) secured to the pulley and provided with recesses 352 to receive a sliding pin 354 mounted in a hub member which is fast on the shaft, as will be readily understood. To control the clutch a pivoted wedge member 358 is provided, under control of a spring 360, this member being connected by a link 362 to an arm 364 mounted to swing about a pivot stud 366 on the frame of the machine. The arm 364 is curved downwardly at its front end, as shown in Fig. 1, and carries a finger 368 which is arranged to be engaged by a lug 370 carried by the slide 280, so that when this slide is moved inwardly as hereinbefore explained and swings the wipers into position to operate on the shoe, the lug 370 engages the finger 368 and tips the arm 364 to clutch the pulley 344 to its shaft and start the wiper operating means just before the cam shaft 18 comes to a stop. The finger 368 is yieldingly mounted on the arm 364 to permit the lug 370 to move beyond it and release the arm. The wedge member 358, however, is prevented from returning into position to disconnect the pulley 344 from the shaft 342 until the cycle of operations of the lasting mechanism has been completed. For this purpose there is mounted to turn on the shaft 336 a controlling disk 372 which is fast on one side of a worm gear 374, the latter being driven by means of a worm 376 on a shaft 378 which is provided with a pinion 380 engaged and driven by a pinion 382 on the shaft 342. These gearing connections are so constructed that the gear wheel 374 makes only one revolution to six revolutions of the gear 338. In the periphery of the disk 372 is a recess 384 which receives a roll 386 on the arm 364 when the wedge member 358 is in stopping position. When the arm 364 is operated to set the clutch and start the lasting mechanism the roll 386 is lifted out of the recess 384, and the disk 372 by engagement with the roll then holds the wedge member 358 in its inoperative position until the completion of the cycle of operations of the lasting mechanism at the end of a single revolution of the gear 374.

As above explained, the lasting mechanism comprises two groups of devices, one for effecting and controlling such lengthwise movements of the front arm as to reciprocate the wipers heightwise of the shoe and the other for effecting and controlling swinging movements of the arm to reciprocate the wipers lengthwise of the shoe. Preparatory to a detailed description of these different groups of devices it may be stated that in what may be termed the first half of the cycle of the lasting mechanism, constructed as herein shown, the wipers receive three successive upwiping movements to wipe the upper heightwise of the toe toward the edge of the insole with alternating downward movements, combined with such movements lengthwise of the shoe as to relieve the pressure of the wipers on the upper prior to each downward movement and to apply the pressure again in each upward movement, the third upwiping movement being longer than the other two for a purpose to be explained. In the second part of the cycle of the lasting mechanism the wipers receive three successive inward overwiping movements with alternating return movements, combined with such upward and downward movements as to apply pressure to the upper perpendicularly to the plane of the insole at each overwipe and to relieve such pressure in each return movement of the wipers, the control of these movements being such that each successive overwiping movement lengthwise of the shoe is slightly longer than the preceding overwiping movement and each successive downward pressure-applying movement is slightly longer than the preceding movement in that direction. The movement of the wipers is illustrated diagrammatically, in a somewhat exaggerated manner, in Fig. 40, where it will be seen that in both the upwiping and the overwiping operations they follow a closed path, as distinguished from merely moving up and down or forward and back over the same course. It may also be explained that the means for effecting and controlling the movements of the wipers lengthwise of the shoe in the overwiping operation is the same means which effects and controls the movements to apply and relax pressure of the wipers at the end of the toe in the upwiping part of the cycle, and that the means which effects and controls up-and-down pressure applying and relaxing movements of the wipers in the overwiping part of the cycle is the same means which effects and controls the upwiping movements in the first part of the cycle.

With reference now more particularly to the group of devices at the right-hand side of Fig. 22 for effecting and controlling movements of the wipers heightwise of the toe, and with reference further to Figs. 25 and 26, it will be seen that the shaft 336 which, as above stated, makes six revolutions in each cycle of the lasting mechanism, has fast thereon an eccentric 388 which operates a pitman 390 connected to an arm 392 fast on a rock shaft 394, and fast on the shaft 394 is also an arm 396 provided with an arc-shaped guideway 398 in which is mounted a block 400 connected by a link 402 to an arm 404 fast on a sleeve 406 which is mounted to turn on the shaft 336. The sleeve 406 has also extending therefrom a second arm 408 connected at its outer end to a pin 410 which carries at its opposite ends a pair of slides 412, the latter carrying at their lower ends a pin 414 which extends through a hole 416 in the upper end of the front arm 290. The slides 412 are mounted for reciprocatory movement in guideways formed in a holder 418 which is pivoted on studs 420 fast on the frame of the machine, the holder being controlled by mechanism to be hereinafter described. It will thus be evident that the eccentric 388 acts in response to the turning movement of the shaft 336 to impart reciprocatory movements to the front arm 290 with its supported wipers to move the wipers heightwise of the toe, and that the length of each of such movements depends upon the position of the block 400 on the arm 396, that is, upon the distance of the pivotal connection of the upper end of the link 402 to the block 400 from the axis of the rock shaft 394. To control and vary the position of this block as required in the course of the cycle there is formed in one side of the disk 372 on the gear wheel 374 a path cam 422 (Fig. 23) which engages a roll 424 carried by a slotted arm 426 embracing the shaft 336. The arm 426 is connected to a lever arm 428 mounted to turn on a stud 430, and fast with the arm 428 is an arm 432 adjustably connected by a link 434 to the link 402. The position of the block 400 and the consequent length or limit of the movement of the wipers heightwise of the toe is thus at all times determined by the action of the cam 422 which is so designed and so timed relatively to the eccentric 388 as to determine for the wipers the length of movements heightwise of the shoe required at the different times in the cycle, both in the upwiping and in the overwiping operations, as hereinbefore explained.

The swinging movements of the front arm to reciprocate the wipers lengthwise of the shoe, both in the upwiping and in the overwiping operations, are effected by swinging the holder 418 about the studs 420. For imparting such movements to the holder there is fast on the shaft 336 an eccentric 436 (Figs. 22 and 27) which operates a pitman 438 connected to the lower end of an arm 440 mounted on a rock shaft 442, this arm having an arc-shaped guideway 444 for a block 446. The block 446 is connected by a link 448 to an arm 450 which is fast on a sleeve 452 mounted to turn on the shaft 336, and fast on this sleeve is also an arm 454 connected by a link 456 to the holder 418. It will be evident that through these connections the eccentric 436 swings the holder 418 forward and backward at each revolution of the shaft 336 and thereby moves the wipers as required lengthwise of the shoe, the extent of each of such movements depending upon the position of the block 446 on the arm 440. For determining and varying the position of this block during the cycle there is provided a path cam 458 which turns with a gear wheel 460 driven at the rate of one revolution to six revolutions of the shaft 336. The means for imparting movement to the gear wheel 460 comprises a spiral gear 462 on the shaft 336 which drives a worm connected to a pinion 464, the latter operating a pinion 466 which drives a worm 468 connected to the wheel 460. Mounted in the groove of the cam 458 is a roll 470 on an arm 472 which is slotted to embrace the shaft 436, and the arm 472 is connected to an arm 474 mounted to rock on a shaft 476. Fast with the arm 474 is an arm 478 adjustably connected by a link 480 to the link 448. It will thus be evident that the cam 458 determines in time relation to the operation of other parts of the mechanism the effective length of the lever arm 440 in imparting movements to the holder 418 to move the wipers lengthwise of the shoe and thereby cooperates with the eccentric 436 in determining the position of the wipers lengthwise of the shoe at all times in the cycle.

It is necessary that in addition to their other movements, as above described, the wipers shall also receive closing movements laterally of the shoe, not only in the overwiping operation but also in the upwiping part of the cycle, since it is desirable in upwiping to embrace the upper closely about the toe and to apply pressure at the sides as well as at the end of the toe. It has already been explained that closing movement of the wipers is effected by outward movement of the rack bars 302 relatively to the wiper holder. For controlling these rack bars there is pivoted at 482 on the front arm 290 an arm 484 (Figs. 18 and 29) having pivotally mounted on its lower end a cross bar 486 pivotally connected at 488 to the depending arms of a pair of bell-crank levers 490 pivoted in turn at 492 on an upwardly extending part of the wiper holder 292. Mounted also on the pivots 488 are a pair of bell-crank levers 494 having depending arms which are forked to embrace the outer cylindrical ends of the rack bars 302 between the shoulders 306 and nuts 496 on the rack bars (Fig. 30), each of the bell-crank levers 494 having also an arm which extends in substantially parallel relation to one of the arms of the corresponding bell-crank lever 490, and between these substantially parallel arms of the different bell-crank levers are positioned compression springs 498. It will be evident that as the parts are thus constructed outward movement of the lower end of the arm 484, that is, movement toward the left as the parts are shown in Fig. 29, will carry the bell-crank levers 494 outwardly while swinging the bell-crank levers 490 about their pivots 492, and that in view of the resistance of the springs 498, tending to prevent swinging movement of the bell-crank levers 494 about their pivots 488, the rack bars 302 will be pulled outwardly and will thereby swing the wipers inwardly at the sides of the toe. It will be evident that resistance of the work to the inwardly swinging movements of the wipers will tend to cause the bell-crank levers 494 to swing about their pivots 488 as the arm 484 continues its movement, against the resistance of the springs 498, and it will also be clear that the compression of these springs increases progressively by reason of the swinging of the bell-crank levers 490 about their pivots 492 on the wiper holder. The wipers are thus closed inward yieldingly with progressively increasing pressure both in upwiping and in overwiping, each of the springs 498 being compressed independently of the other as determined by the degree of resistance encountered by its wiper.

For imparting wiper closing movements to the arm 484 there is pivoted at 500 (Fig. 1) an arm 502 provided with a yoke 504 which carries a pair of slotted links 506 (Fig. 18), these links embracing the opposite ends of a pin 508 on the arm 484. The arm 502 is connected at its upper end by a link 510 to one arm of a bell-crank 512 mounted on the same pivot as the arm 364, this bell-crank carrying at its lower end a roll 514 which is adapted to be engaged by a rocker arm 515 (Figs. 22 and 23) fast on a rock shaft 516 which has a second arm 517 carrying a roll which runs in a cam track 518 formed in one side of the gear wheel 374. When the front arm 290 is in its initial position the inner ends of the links 506 are arranged to abut against it (Fig. 18), and the front arm thus acts to hold the arm 512 in such position that the roll 514 is at a considerable distance from the operating arm 515. When the front arm, however, is swung toward the shoe by the action of the slide 280 (Fig. 18ª) it causes the arm 512 to assume such a position, by reason of the weight of the parts, that the roll 514 is swung by its bell-crank 512 into position to be engaged by the arm 515. Consequently, in the course of the cycle of operations the arm 515 acts in predetermined time relation to other movements of the wipers to swing the bell-crank lever 512 and through the connections described, including the links 506, to swing the arm 484 outwardly and thus to impart closing movement to the wipers, and then to release the wipers and permit them to open again, these operations being preferably so timed relatively to others that the wipers, as determined by the shape of the cam 518, are closed yieldingly about the toe with firm pressure at the sides of the toe for each upwiping operation and are thereafter closed inwardly over the feather of the insole in each overwiping operation, the wipers opening each time as they are retracted from the shoe.

It has already been mentioned that the third upwiping movement of the wipers is longer than the two preceding upwiping movements. One of the advantages of this is that it permits a convenient use of the front arm 290 to trip the toe gripper and cause it to release the upper when the upwiping operation has been substantially completed. For this purpose the front arm carries a tripping member 519 which, in the third and longest upward movement of the arm, engages the latch 108 on the toe gripper and thereby disconnects the gripper bar from the member 106 to cause the jaws to open.

It is desirable to insure that the toe end of the insole shall lie close to the bottom face of the last when the wipers close inwardly over the feather of the insole, and for this purpose the machine is provided with a sole-edge holddown 520 shaped to engage the feather of the insole about the toe and guided by a bracket 522 for movement heightwise of the shoe, the holddown being connected by a rod 524 to an arm 526 which is fast on a rock shaft 528 (Figs. 22, 25 and 27), this shaft having thereon an arm 530 provided with a roll 532 mounted in a cam groove 534 formed in one side of the gear wheel 460. Since the sole rest 30 is rocked downwardly in the upper pulling operation, the cam groove 534 is so shaped as to impart a slight downward movement to the holddown at the beginning of the cycle of the lasting mechanism thus insuring that the holddown will press the feather of the insole at the toe against the bottom face of the last prior to the overwiping movement of the wipers. The holddown remains in this position until the upwiping operations have been completed and is then moved by its cam away from the insole to avoid interference with the wipers as they are closed inwardly in the first overwiping operation. When the parts are returned to starting position the holddown is returned to the position illustrated in Fig. 2 ready to engage the feather of the insole when the next shoe is presented in engagement with the sole rest.

For fastening the upper in lasted position about the toe the machine is constructed to utilize a toe binder *b* provided with angled ends, in accordance with the method disclosed in Letters Patent No. 1,406,280, granted upon my application of Feb. 14, 1922. The mechanism designed for applying to the shoe a binder of this character, illustrated in Figs. 28 to 32 inclusive, embodies some features which are similar to the disclosure of the hereinbefore mentioned Letters Patent No. 1,436,194, and Letters Patent No. 1,634,511, granted on my application on July 5, 1927. Secured to the lower faces of the wipers 288 are toe-embracing plates 536 the inner edge faces of which are curved similarly to the edges of the wipers and are spaced from the edges of the wipers a distance substantially equal to the width of the feather of the insole so that the plates 536 by engagement with the upper about the toe assist in defining a sharp edge line at the edge of the insole and in preventing the wipers from being closed inwardly too far. Between the wipers and the greater portion of the plates 536 a space is provided for the movement of thin binder-applying plates 538 which are mounted and controlled similarly to the plates shown in Letters Patent No. 1,634,511, above mentioned. Briefly stated, the plates 536 are provided with guideways 540 and 542 having therein arc-shaped slides 544 and 546 connected respectively to the plates 538 by pivots 548 and 550. Springs 552 are mounted in recesses in the wipers and connected to the slides 544 to position the plates 538 initially as illustrated in Figs. 30, 31 and 32. As thus mounted and guided, the plates 538, in applying the binder about the toe and forcing its ends into the shoe, have a component of bodily movement lengthwise of the shoe as well as a component of swinging movement laterally of the shoe, and are thus permitted to lie initially in such relation to the edges of the wipers that the binder may be held retracted a considerable distance from said edges at the end as well as at the sides of the toe, thus avoiding any displacement of the binder in the upwiping operation.

Operative movement is imparted to the binder applying plates 538 by slides 554 which are guided in the opposite sides of the wiper holder 292 and engage lugs 556 on the plates 538. Operative forward movement is imparted to the slides 554 by means of bell-crank levers 560 having depending arms provided with rolls 562 in engagement with lugs 564 on the slides and upwardly extending arms engaged and operated by rolls 566 mounted on the lower ends of members 568 which are carried by slides 570 mounted in guideways formed in brackets on the frame of the machine (Figs. 20 and 21). The slides 570 are connected by links 572 to projections 574 on the slide 280 hereinbefore described. It will be recalled that in machines of the general type illustrated the slide 280, after having been moved inwardly as and for the purpose described, is swung downwardly, as illustrated in Fig. 19, and is thereafter moved forwardly and upwardly to its initial position, and it is the downward swinging movement of the slide that is utilized in the present machine to operate the members 560 for applying the binder to the shoe. It will be evident that as the slide 280 receives its downward swinging movement it operates through the links 572 to impart downward movement to the slides 570, thereby operating the members 568 to swing the bell-cranks 560, the latter having been moved into position to be engaged by the rolls 566 in the movement of the front arm to carry the wipers into position to operate on the shoe. In order to insure that adequate pressure will be applied to the binder at the opposite sides of the toe, while allowing for such differences in the extent of movement of the binder applying plates 538 as may be due to differences in the condition of the shoe materials at the opposite sides of the toe, there is provision for yield between the slides 570 and the members 568, the latter being slidably mounted in guideways in the slides 570 and these slides having mounted thereon spring plungers 576 which are normally positioned in recesses formed in the members 568 but are permitted to slip out of these recesses in response to a predetermined degree of resistance encountered by the members 568. In the return of the parts to starting position the upper ends of the members 568 are carried into engagement with stop screws 578 to insure that the plungers 576 will be returned to their initial relation to the members 568.

The binder is applied to the toe and its ends are driven into the shoe at the end of the third overwiping movement of the wipers, there being sufficient dwell in the wiper operating connections to permit these operations to be performed before the wipers are retracted from the shoe. Since the movement of the slide 280 is utilized to operate the binder applying members, it is necessary to start the cam shaft 18 again in operation slightly before the wiper operating mechanism arrives at the end of its cycle. This is done by means of a cam 580 (Fig. 23) which engages a roll 582 mounted on a lever arm 584 and by raising the arm acts through a link connection 586 to lift the clutch tripping treadle rod 28. It may be stated at this point that the cam shaft 18 then continues to the end of its cycle, returning the parts which it controls to starting position. As the slide 280 is swung downwardly in the manner explained, it carries members 588 which are mounted thereon into engagement with the downwardly curved arms of the locking levers 324 (Fig. 19) and thereby raises the pins 326 out of the slots 328 and releases the slides 312 so that they may be moved forwardly again with the front arm 290. As the slide 280 is swung downwardly the slotted ends of the plates 308 necessarily release the pins 310 on the slides 312, and in order that these slides and the front arm may be returned to starting position by the forward and upward movement of the slide 280 whereby it is again connected to the pins 310, the slides 312 are provided with downwardly curved extensions 589 engaged by rolls 590 which are carried by the slide 280. The manner in which other portions of the machine are returned to starting position will be readily understood without detailed explanation.

The means for forming the binder and for transferring it into position to be operated upon by the binder applying means is in many respects broadly similar to the organization described and claimed in Patent No. 1,516,499, but embodies also various features which are novel in the present application. The binder forming and transferring mechanism is supported upon a frame 592 which is mounted on the front of the machine. Power for operating this mechanism is derived from a pulley 594 (Fig. 1) on the continuously driven shaft 150, this pulley being connected by a belt 596 to a pulley 598 (Fig. 33) which, through gearing 600 and 602 (Fig. 35), is operatively connected to a clutch member 604 mounted to turn upon a shaft 606. The member 604 is herein shown as one of the members of a pin clutch, although any suitable form of clutch may be utilized for driving the shaft 606. The clutch is controlled by means of a pivoted wedge member 608 having rigidly connected thereto a finger 610 which is arranged to be engaged and operated (Fig. 19) by a member 612 on the slide 280 when this slide receives its forward movement in the return of the parts of the machine to starting position, as hereinbefore explained. It will be understood that through the clutch actuating connections described, the member 612 serves to cause the shaft 606 to be connected to the source of power and thereby to start the binder forming and transferring means in operation substantially at the end of the cycle of operations of the pulling-over and lasting means. As the member 612 swings upwardly it releases the finger 610, and the wedge member 608 is then swung backwardly by a spring 614 into position to stop the shaft 606 at the end of a single revolution.

As in the construction disclosed in Letters Patent No. 1,634,511, the binder forming mechanism herein shown is constructed to operate at the beginning of each cycle upon binder wire fed into position in the preceding cycle of the mechanism. For severing a section of wire of the proper length for a binder and for bending its ends to provide prongs to be forced into the shoe, there are provided a pair of bending slides 616 (Fig. 34) which cooperate with the ends of an anvil member 618. The slides 616 have rack teeth engaging pinions 620 which are driven by a rack bar 622, this rack bar receiving its movement from a segment arm 624 operated through a lever 626 (Fig. 36) from a path cam 628 formed in the periphery of a cam wheel 630 on the shaft 606, the arm 624 carrying a roll 632 which is operated by the cam 628.

Associated with the anvil 618 is a binder carrier which transfers the binder from the forming mechanism to the toe wiper mechanism. This carrier comprises a pair of carrier blocks 634 mounted respectively on arms 636 and 638 (Figs. 35 and 36) pivoted at 640 and 642 on the frame of the forming mechanism. The arm 636 is connected by a link 644 to an arm 646 which is fast on a rock shaft 648, and the arm 638 (Fig. 35) is connected by a link 650 to an arm 652 which is also fast on the rock shaft 648. It will thus be seen that the blocks 634 are rigidly connected together for binder transferring movement. In the binder receiving position of the carrier, portions of the blocks 634 extend into recesses formed in the inner side of the anvil member 618 near its opposite ends, as illustrated in Figs. 34 and 37, and the blocks 634 are provided with slots 654 which, in that position of the blocks, are in alinement with the upper surface of the anvil and also in alinement with a binder guiding recess 656 formed in the lower edge of a guide plate 658 which is mounted above the anvil. It will thus be evident that the binder wire, when it is advanced into position for the forming of a binder, is fed through the slots 654 in the carrier blocks as well as along the guideway provided by the recess 656.

After the binder $b$ has been formed by the operation of the members 616, as above explained, and after these members have been retracted, the anvil 618 is swung forwardly to release the binder. For this purpose the anvil is supported upon a pair of connected arms 660 which are mounted on pivot studs 662, and projecting inwardly from one of these arms is a lever 664 (Fig. 35) connected by a link 666 to an arm 668 which carries a roll 670 operated upon by a path cam 672 formed in a cam wheel 674 on the shaft 606. Through these connections the anvil is swung forwardly by the cam 672 and releases the binder, which is prevented from following the anvil by the action of the plate 658. The binder is then supported near its ends by the carrier blocks 634 and in the transfer of the binder to the wiper mechanism the carrier is swung into position where the slots 654 in the blocks aline with the opening between the wipers 288 and the underlying plates 536, as shown in Fig. 39. To effect this movement of the carrier the arm 652 is connected by a link 676 to a lever 678 which carries a roll 680 controlled by a cam 682 in the cam wheel 674. It will be seen that the cam 682 releases the roll 680, and the weight of the parts then acts to swing the carrier into position to deliver its binder to the wiper mechanism, the blocks 634 engaging the wipers to limit their movement. The studs 640 and 642 about which the carrier swings are in alinement with the stud 294 about which the wipers are adjustable (Fig. 29) when the arm 290 is in its initial position, and consequently it is insured that the carrier will be properly positioned to deliver its binder to the wiper mechanism in any position of adjustment of that mechanism. After the delivery of the binder the carrier is returned to binder receiving position by the action of the cam 682, and the anvil 618 is then swung back into operative position prior to the feeding of the wire, as will be readily understood.

When the binder carrier is in position to deliver the binder to the wiper mechanism the binder is engaged and transferred into position to be operated upon by the binder applying members 538 by the action of a gripper which is supported by and movable with the wiper mechanism toward and from the shoe. This gripper comprises a casing 684 (Fig. 29) movable in a guideway formed in the wiper holder 292 below the wipers, this casing being shaped at its inner end to provide a gripper jaw 686 cooperating with a jaw 688 which is movable in guideways in the gripper casing toward and from the jaw 686, a spring 690 being provided for moving the jaw 688 to open position. The jaw member 688 is provided with rack teeth 692 engaged by the teeth of a gear sector 694 pivoted at 696 on the casing 684, this gear sector having an upwardly extending finger 698 arranged to be engaged by a latch 700 to hold the jaw 688 in closed or gripping position. The latch 700 is pivoted at 702 on a closing slide 704 movable in the casing 684, and is controlled by a spring 706. Within the closing slide 704 is a spring 708 which bears at its outer end on a screw 710 threaded in the closing slide and at its inner end on a plunger 712 which engages a pin 714 on the casing 684. It will thus be seen that the spring 708 tends to move the closing slide 704 toward the left (Fig. 29) and thus to hold the jaw 688 in gripping position by the action of the latch 700 on the gear sector 694, the pin 714 acting to limit movement of the closing slide in this direction in case there is no binder between the jaws. The gripper casing 684 is under control of springs 716 (Fig. 28) which are supported by rods 746 and tend to hold the gripper in the position in which it is shown in Fig. 29 and against the resistance of which the gripper is moved inwardly to engage the binder in the binder carrier. Movement of the gripper under the influence of the springs 716 is limited by engagement of the jaw 686 with the edge wall 718 of a recess formed in the edges of the plates 536, and when the gripper is in this position it forms a continuation of the inner shoe engaging edges of the plates 536, so that the gripper will abut against the end face of the shoe when the wipers are in their closed position.

In the construction shown the gripper maintains its hold on the binder, to insure against displacement of the binder, until the time when the members 538 are operated to apply the binder to the shoe. In order to cause the gripper to release the binder so that it may be advanced and applied about the overwiped margin of the upper by the members 538, there is pivotally mounted on the lower side of the wiper holder a releasing member 720 provided with a screw 722 for engaging a depending finger 724 on the latch 700, the member 720 having a pin 726 controlled by a cam plate 728 which is fast on one of the slides 554 that operate the members 538. When these slides receive their operative movement to advance and swing inwardly the members 538, the plate 728 releases the pin 726, and a spring 730 then acts on the member 720 to cause this member to lift the latch 700 from engagement with the finger 698, and thereupon the spring 690 imparts opening movement to the gripper jaw 688, such movement being limited by engagement of the gear sector 694 with a pin 732. The binder is thus released in time for its application to the shoe by the members 538. When the slides 554 are retracted the cam plate 728 acts on the pin 726 to return the releasing member 720 to its first position. When the latch 700 is thus released it engages the end face of the finger 698 and the gripper jaws remain in open position until the gripper has been moved inwardly to receive another binder.

For moving the gripper inwardly to receive another binder presented to the wiper mechanism by the binder carrier after the wipers have returned to their starting position, there is pivoted to swing about the shaft 606 a gripper operating member 734 (Fig. 36) the outer end of which is in the form of a plate 736 adapted to engage the end of the screw 710 on the gripper when the member 734 receives its operative movement. The member 734 is connected by a link 738 to an arm 740 provided with a roll 742 operated by a path cam 744 formed in one side of the cam wheel 630. By this operating means the gripper is moved forwardly through pressure applied to the screw 710 in time relation to the operative movement of the binder carrier, as illustrated in Fig. 39. When the gripper arrives at the limit of its forward movement, determined as hereinafter explained, the binder presented by the binder carrier is between the open jaws of the gripper, and by continuous movement of the plate 736 the closing slide 704 is forced farther inwardly against the resistance of the spring 708 and thereby carries the latch 700 into position to connect with the finger 698. In the reverse movement of the plate 736 the spring 708 first acts on the closing slide to cause the latch to move the jaw 688 into position to grip the binder against the cooperating jaw 686, and then the springs 716 become effective to retract the gripper and thereby to pull the binder out of the binder carrier and into position to be operated upon by the members 538 in lasting the next shoe.

It will be seen by reference to Fig. 29 that the gripper is in such relation to the wiper mechanism as to position that portion of the binder which it engages in the same plane as the members 538, thereby avoiding any distortion of the binder. For this purpose the wiper plates 288 are provided with a recess 748 (Figs. 28 and 31) to receive the gripper jaws, this recess being located at a distance from the edges of the wiper plates so as to avoid any break in the continuity of those edges. To guide the gripper for movement of its jaws into and out of the recess 748 without interference with the wipers, cam tracks 750 are provided in opposite sides of the gripper casing 684, and pins 752 on the wiper holder engage the gripper casing in these cam tracks to cause the gripper jaws to tip downwardly at the beginning of their forward movement to receive a binder, and then upwardly again, and in their return outward movement to tip downwardly and upwardly so as to clear the edges of the wipers and finally to position the jaws properly in the recess 748 as shown in Fig. 29.

The cam tracks and the pins are so formed and arranged as to limit the forward movement of the gripper at the proper point for the open jaws to embrace the binder presented by the binder carrier.

In case for any reason the gripper should fail to remove a binder from the binder carrier, it is desirable that the binder be ejected from the carrier prior to the feeding of the binder wire which takes place, as will be explained, immediately after the return of the carrier to its starting position. For this purpose there are pivotally mounted on the plate 658 (Fig. 37) adjacent to the paths of movement of the carrier blocks 634 a pair of ejector fingers 754 yieldingly controlled by springs 756. As the carrier returns to binder receiving position, the blocks 634 engage pins 757 on the fingers 754 and swing the lower ends of the fingers toward the right (Fig. 38). Any binder which may remain in the carrier will thus be engaged by these fingers and ejected from the blocks 634 as the carrier is returned to its starting position.

The binder wire $a$ is fed from a reel 758 (Fig. 33) through an opening in the center of a fixed shaft 760 and thence through a rotatable wire straightening device 762 which may be constructed in any suitable manner, for example as shown in Letters Patent No. 1,516,499. Mounted to turn and also to slide lengthwise on the shaft 760 is a gear wheel 764 which is fast with one of the members 766 of a cone clutch arranged to cooperate with a clutch member 768 on the end of the wire straightener. The gear wheel 764 with its clutch member is driven continuously by a gear wheel 770 which turns with the pulley 598. For controlling this secondary clutch the member 766 is connected to an arm 772 controlled by a face cam 774 on the shaft 606, this cam engaging a roll 776 on an arm 778 which is connected by a link 780 to the arm 772 through a spring 782. When the cam 774 acts on the arm 778 the clutch member 766 is thus moved yieldingly into clutching engagement with the member 768 against the resistance of a return spring 784. It will be understood that the cam 774 is timed to start the wire feeding means in operation near the end of the cycle of the shaft 606, the latter being controlled as hereinbefore explained.

The feeding of the wire is effected by reciprocatory movement of a feed block 786 operated by a lever arm 788 to which movement is imparted through a short arm 790 and a link 792 from a crank arm on a shaft 794. The shaft 794 is driven from a worm 796 on the wire straightening device through a worm gear 798 which is fast on a shaft 800, this shaft having thereon a gear wheel 802 (Fig. 35) which engages and drives a gear wheel 804 on the shaft 794. The feeding of the wire is effected in two revolutions of the shaft 794, and the wire feeding mechanism is brought automatically to a stop at the end of the second revolution of this shaft. For this purpose there is provided a controller disk 806 which is mounted to turn on the shaft 794 and has a recess in its periphery to receive a roll 808 carried by the arm 778. Turning movement at one-half the rate of the movement of the shaft 794 is imparted to the disk 806 through reduction gearing comprising a gear wheel 810 which turns with the gear 804 and drives a gear 812 mounted to turn on the shaft 800, the gear 812 having fast thereon a gear 814 which drives a gear 816 fast on the disk 806. It will be understood that when the cam 774 acts on the clutch to start the wire feeding mechanism, it moves the roll 808 out of the recess in the disk 806 and that at the end of a single revolution of the disk the roll again drops into this recess under the influence of the spring 784 and the wire feeding means is thus brought to a stop. Since the construction of the wire feeding instrumentalities is generally similar to what is shown in Letters Patent No. 1,516,499, no further description of these parts is necessary for an understanding of the present invention.

In the operation of the machine as a whole, briefly summarized, the operator presents a last with its upper and insole in the position indicated diagrammatically in Fig. 2, inserting the margin of the upper materials within the open toe and side gripper jaws and gaging the lengthwise position of the last by presenting its toe end face against the inner fixed jaws of the toe gripper, these jaws, by reason of their relative arrangement, acting also to determine the lateral position of the toe end of the last, as will be evident by reference to Fig. 17. As the work is thus presented, the feather of the insole at the toe end is engaged by the holddown member 520. The operator then starts the machine, whereupon the several grippers are operated to grip and pull the upper, the corner jaws of the toe gripper receiving an inward swinging movement substantially to the broken line position of Fig. 17 through the action of the members 90 upon the slides 82. The machine then comes to a stop to enable the operator to observe the condition of the upper, and while the cam shaft 18 is thus at rest the lever 110 may be operated in the customary manner for straightening the tip, and supplemental movements also may be imparted to one or more of the grippers by the power-operated means illustrated in Fig. 4 for any of the purposes hereinbefore explained, for example to increase or lessen the force of the pull at one or both sides or at the toe or to adjust the position of the toe gripper relatively to the plane of the insole or to the margin of the upper. When the machine is again started by depression of the treadle the side clamps 272 are moved into operative position, the margin of the upper is drawn inwardly and released by the side grippers and is overwiped and fastened by tacks at the rear of the toe end of the shoe, and the front arm 290 is operated to carry the toe wipers with the binder holding and applying means into position to operate on the toe, the arm being locked in operative position by the action of the locking arms 324 upon the slides 312. The cam shaft 18 then comes again to a stop with the controlling slide 280 in its retracted position, the toe gripper still maintaining its hold upon the upper. Shortly before the cam shaft comes to a stop, the lug 370 acts on the finger 368 to trip the clutch which controls the operation of the wiper operating mechanism. During this second pause in the cycle of the cam shaft 18, operative movements are imparted to the toe-embracing wipers to wipe the upper heightwise of the toe a plurality of times and thereafter to wipe it inwardly over the feather of the insole a plurality of times, as illustrated diagrammatically in Fig. 40 and as hereinbefore explained in detail. In the last upwiping movement the member 519 on the arm 290 acts to trip the toe gripper and to release it from the upper. As hereinbefore explained, the wipers act in successive overwiping movements to increase their pressure on the upper materials both inwardly toward the rib of the insole and downwardly toward the feather of the insole. Near the end of the cycle of the toe wiping mechanism the main clutch is tripped automatically to start the cam shaft 18 again in operation, and during the pause in the movement of the wipers at the end of the final overwipe the binder applying mechanism is operated to apply the binder tightly about the toe and to force its ends into the shoe to anchor it. The cam shaft 18 then continues to the end of its cycle, returning the parts to starting position, the slide 280 acting to unlock the members 312 to permit the return of the front arm 290. In the return forward movement of the slide 280 the main clutch of the binder forming and transferring means is tripped by the action of the member 612 on the finger 610, whereupon a section of wire previously fed into operative relation to the anvil and the bending slides is severed and formed into a binder and the binder carrier is operated to carry the binder thus formed into position to aline with the opening between the wipers and the plates 536, as illustrated in Fig. 39. The gripper, with its jaws in open position, is then moved forwardly by the action of the member 736, as illustrated in Fig. 39, and upon retractive movement of the member 736 the jaws are closed automatically upon the binder and the gripper is moved reversely by its springs 716 to carry the binder into the wiper mechanism ready for the operation upon the next shoe, the gripper maintaining its hold on the binder as hereinbefore explained. Near the end of the cycle of the parts which are operated by the main clutch of the binder forming mechanism, the secondary clutch 766, 768 is operated to start the wire straightening and feeding means in operation, and the binder carrier having been returned to its starting position the wire is fed into position for use in forming the next binder, the secondary clutch being automatically disconnected at the end of the wire feeding operation.

Novel features of the gripper-operating and controlling means and of the toe-gripper construction herein disclosed are claimed in a divisional application, Serial No. 187,394, filed on April 28, 1927.

Having described the invention, what I claim as new and desire to secure by Letters Patent of the United States is:

1. A pulling-over and toe lasting machine having, in combination, means for pulling-over an upper, toe-embracing wipers, and operating mechanism for imparting to said wipers in automatically determined time relation upwiping and over-wiping movements after the pulling-over operation has been substantially completed.

2. A pulling-over and toe lasting machine having, in combination, pulling-over means automatically operative to pull an upper over a last and to come to a stop with the upper held under tension, toe-embracing wipers, and wiper operating means automatically operative upon a subsequent starting of the machine to move the wipers heightwise of the toe to upwipe the upper and inwardly over the bottom of the last to overwipe the upper.

3. A pulling-over and toe lasting machine having, in combination, a toe gripper, opposite side grippers, means for effecting relative movement of said grippers and a last to pull the upper over the last, gripper controlling mechanism enabling the operator to adjust the upper relatively to the last lengthwise of the edge of the last bottom after the upper has been pulled, toe-embracing wipers, and power-operated means for imparting to said wipers after the pulling of the upper upwiping and overwiping movements in automatically determined time relation.

4. A pulling-over and toe lasting machine having, in combination, means for pulling-over an upper, toe-embracing wipers, and automatic means for moving said wipers heightwise of the toe after the upper has been pulled to wipe the upper to the edge of the shoe bottom and for then moving them inwardly over the bottom of the last to overwipe the upper.

5. A pulling-over and toe lasting machine having, in combination, means for pulling an upper at the toe of a last, toe-embracing wipers, automatic means for moving said wipers heightwise of the toe to upwipe the upper and inwardly over the bottom of the last to overwipe the upper, and means for maintaining the last substantially stationary during said upwiping and overwiping movements of the wipers.

6. A pulling-over and toe lasting machine having, in combination, means for pulling-over an upper, toe-embracing wipers, power-operated means for imparting to said wipers an automatically determined movement heightwise of the toe to upwipe the upper while the shoe is held substantially stationary in pulling-over position, and additional means for moving the wipers inwardly to overwipe the upper.

7. A pulling-over and toe lasting machine having, in combination, means for pulling-over an upper, toe lasting mechanism, and operating means for imparting to said toe lasting mechanism movement heightwise of the toe to upwipe the upper and in automatically determined time relation to said upwiping movement repeated movements over the bottom of the shoe to overwipe the upper.

8. A pulling-over and toe lasting machine having, in combination, means for pulling-over an upper, toe lasting mechanism, and operating means for imparting to said toe lasting mechanism repeated movements heightwise of the toe to upwipe the upper a plurality of times and for thereafter imparting thereto in automatically determined time relation to said upwiping movements inward movement over the bottom of the shoe to overwipe the upper.

9. A pulling-over and toe lasting machine having, in combination, upper gripping means, mechanism for effecting relative movement of said upper gripping means and a last to pull the upper, toe lasting mechanism, and operating means for imparting to said toe lasting mechanism repeated movements heightwise of the toe to upwipe the upper a plurality of times and for thereafter effecting in automatically determined time relation to said upwiping movements relative movement of the toe lasting mechanism and the last to overwipe the upper.

10. A pulling-over and toe lasting machine having, in combination, upper gripping means, mechanism for effecting relative movement of said upper gripping means and a last to pull the upper, toe lasting mechanism, and power means automatically operative in a predetermined cycle to impart to said toe lasting mechanism repeated movements heightwise of the toe to upwipe the upper and thereafter repeated movements over the bottom of the last to overwipe the upper.

11. A pulling-over and toe lasting machine having, in combination, means for pulling-over an upper, and toe lasting means automatically operative in a predetermined cycle after the pulling of the upper to wipe the upper repeatedly over the last while the shoe is maintained in its pulling-over position.

12. A pulling-over and toe lasting machine having, in combination, means for pulling-over an upper, and power-operated toe lasting means automatically operative in a predetermined cycle to engage the shoe in its pulling-over position after the pulling of the upper and to wipe the upper repeatedly both heightwise of the toe and inwardly over the bottom of the last.

13. A pulling-over and toe lasting machine having, in combination, means for pulling-over an upper comprising means for gripping the upper at the toe, toe-embracing wipers, operating means for moving said wipers heightwise of the toe to upwipe the upper and inwardly to overwipe the upper, and mechanism for opening said toe gripping means to release the upper in automatically determined time relation to the operative movement of the wipers.

14. A pulling-over and toe lasting machine having, in combination, means for pulling-over an upper comprising a gripper for engaging the upper at the toe, toe-embracing wipers, operating means for effecting relative movements of the shoe and said wipers to wipe the upper heightwise of the toe and inwardly over the bottom of the shoe, and automatic means for releasing said toe gripper from the upper prior to the overwiping operation.

15. A pulling-over and toe lasting machine having, in combination, means for pulling-over an upper comprising a gripper for engaging the upper at the toe, toe lasting means for wiping the upper repeatedly heightwise of the toe and then inwardly over the bottom of the shoe, and mechanism automatically operative substantially at the end of the last upwiping operation and prior to the overwiping operation of the lasting means to release the toe gripper from the upper.

16. A machine of the class described having, in combination, means for pulling an upper over a last comprising an upper-engaging gripper, a device movable heightwise of the last to wipe the upper toward the edge of the shoe bottom, and mechanism controlled by the upwiping movement of said device for releasing the gripper from the upper.

17. A machine of the class described having, in combination, means for pulling an upper over a last comprising an upper engaging gripper provided with a latch for maintaining its jaws in gripping relation, mechanism movable heightwise of the shoe to wipe the upper toward the edge of the shoe bottom, and a member carried by said wiping mechanism and operative in the upwiping movement of said mechanism to engage said latch and release the gripper from the upper.

18. A pulling-over and toe lasting machine having, in combination, means for pulling an upper over a last comprising a gripper for engaging the upper at the toe, toe lasting means movable heightwise of the toe, and a device automatically operative in response to such heightwise movement of the toe lasting means to release the toe gripper from the upper.

19. A pulling-over and toe lasting machine having, in combination, means for pulling an upper over a last comprising a gripper for engaging the upper at the toe, toe-embracing wipers, a wiper support for moving said wipers heightwise of the toe while the gripper holds the upper under tension, and a device carried by said wiper support and operative in such heightwise movement of the wipers to release the toe gripper from the upper.

20. A machine of the class described having, in combination, means for pulling an upper over a last comprising an upper engaging gripper, wiping mechanism, means for moving said wiping mechanism heightwise of the last to upwipe the upper while the upper is held by the gripper and for thereafter imparting to said mechanism another upwiping movement of increased extent, and a device responsive to said last-named movement to release the gripper from the upper.

21. A pulling-over and toe lasting machine having, in combination, means for pulling an upper over a last comprising a gripper for engaging the upper at the toe, toe lasting mechanism, automatic means for imparting to said toe lasting mechanism repeated movements heightwise of the toe including a final movement of increased extent, and a device automatically operative in response to said final movement of the toe lasting mechanism to release the toe gripper from the upper.

22. A pulling-over and toe lasting machine having, in combination, means for pulling an upper over a last comprising a gripper for engaging the upper at the toe, toe-embracing wipers, automatic means for imparting to said wipers repeated upwiping movements, including a final movement of increased extent, and thereafter an overwiping movement, and means operative in response to said final upwiping movement of the wipers to release the toe gripper from the upper prior to the overwiping movement of the wipers.

23. A machine of the class described having, in combination, means for gripping and pulling an upper at the toe of a last including portions of the upper at the opposite sides of the toe, toe lasting mechanism for wiping the upper heightwise of the toe, and mechanism for imparting to said upper gripping means movement to pull the upper inwardly toward the sides of the toe to facilitate the upwiping of the upper.

24. A machine of the class described having, in combination, means for pulling an upper at the toe of a last comprising different pairs of gripper jaws relatively movable laterally of the toe, means for wiping the upper heightwise of the toe, and means for operating said gripper jaws to pull the upper inwardly at the sides of the toe prior to the upwiping operation.

25. A machine of the class described having, in combination, means for gripping and pulling an upper at the toe of a last comprising gripper jaws relatively movable to pull the upper inwardly at the sides of the toe, toe-embracing wipers, and automatic means for moving said gripper jaws relatively to pull the upper inwardly about the toe preparatory to the operation of the wipers on the toe.

26. A machine of the class described having, in combination, a toe gripper comprising a plurality of pairs of gripper jaws relatively movable to pull an upper inwardly about the toe of a last and arranged to grip the upper with the jaws in outspread relation, means for gathering the upper about the toe and for working it inwardly over the bottom of the last, and mechanism automatically operative to cause said jaws to pull the upper inwardly at the sides of the toe prior to the operation of said gathering means on the toe.

27. A machine of the class described having, in combination, a toe gripper comprising gripper jaws mounted to swing inwardly at the sides of the toe about axes extending heightwise of the toe, toe lasting mechanism, and automatic means to cause said jaws to swing inwardly to pull the upper toward the sides of the toe preparatory to the operation of the toe lasting mechanism on the shoe.

28. A machine of the class described having, in combination, a toe gripper comprising opposite pairs of gripper jaws for pulling an upper at the sides of the toe, toe lasting mechanism, means for effecting relative movement of said gripper and the last to pull the upper heightwise of the toe prior to the operation of the toe lasting mechanism on the shoe, and mechanism automatically operative in said relative pulling movement to cause said jaws to pull the upper inwardly at the sides of the toe.

29. A machine of the class described having, in combination, means for pulling-over and fastening an upper at the opposite sides of the forepart at the rear of the toe end, and power-operated toe lasting mechanism having an automatically determined cycle of movements to work the upper into lasted position about the toe after it has been pulled over and fastened at the opposite sides of the forepart.

30. A machine of the class described having, in combination, pulling-over means comprising toe and side grippers, side overlaying and fastening devices, means for operating said devices to overlay and fasten the upper at the opposite sides of the forepart while the upper is held by the toe gripper, and automatic means for thereafter lasting the toe of the shoe.

31. A machine of the class described, having in combination, pulling-over mechanism and power-driven operating means therefor, and independently operated power means for lasting the toe of the shoe while said operating means for the pulling-over mechanism is at rest.

32. A machine of the class described having, in combination, pulling-over mechanism and power-driven operating means therefor, independently operated power-driven toe lasting mechanism, and a device controlled by the operating means for said pulling-over mechanism for starting the operation of said toe lasting mechanism.

33. A machine of the class described having, in combination, power-operated pulling-over means, separately controlled power-operated toe lasting means including a clutch, and mechanism for actuating said clutch to start the toe lasting operation in time relation to the operation of the pulling-over means.

34. A machine of the class described having, in combination, power-operated means for pulling-over an upper and for overlaying and fastening the upper at the opposite sides of the forepart, separately controlled power-operated toe lasting mechanism, and automatically controlled clutch means for starting said toe lasting mechanism in operation in time relation to said overlaying and fastening of the upper.

35. A machine of the class described having, in combination, pulling-over devices and a train of operating mechanism therefor including a clutch, toe lasting devices and a train of operating mechanism therefor including a second clutch, and actuating means for said last-named clutch controlled by the train of mechanism for operating the pulling-over devices.

36. A machine of the class described having, in combination, pulling-over means automatically controlled to come to a stop at an intermediate point in the cycle of the machine, power-operated toe lasting means including a clutch automatically controlled to start the toe lasting operation in time relation to the stopping of said pulling-over means, and mechanism controlled by said toe lasting means for thereafter again starting the pulling-over means.

37. A machine of the class described having, in combination, pulling-over devices, side overlaying and fastening devices, operating means automatically controlled to come to a stop after the upper pulling operation and again after the side overlaying and fastening operation, and separately controlled power-driven toe lasting means arranged to perform the toe lasting operation after said operating means has come to a stop the second time.

38. A machine of the class described having, in combination, pulling-over mechanism and operating means therefor including a main clutch, toe lasting mechanism and operating means therefor including a second clutch, manual means for actuating said main clutch, automatic means for actuating said second clutch, and additional automatic means for actuating said main clutch at a predetermined point in the cycle.

39. A machine of the class described having, in combination, pulling-over means, side overlaying and fastening devices, an operating slide for imparting inward movement to said side overlaying and fastening devices, toe lasting mechanism, and clutch means controlled by said slide for starting the operation of said toe lasting mechanism.

40. A machine of the class described having, in combination, pulling-over means, side overlaying and fastening devices, a controlling member connected to said side overlaying and fastening devices to move them inwardly, toe lasting mechanism arranged to be moved toward the toe by said controlling member, and clutch means controlled by said member for starting the operation of the toe lasting mechanism.

41. A machine of the class described having, in combination, pulling-over means, side overlaying and fastening devices, a controlling slide connected to said devices to move them inwardly, toe lasting mechanism connected to said slide to be moved toward the toe by the operative movement of the slide, and means for imparting operative movement to said toe lasting mechanism to work the upper into lasted position while said slide is stationary.

42. A machine of the class described having, in combination, pulling-over means, side overlaying and fastening devices, a controlling slide connected to said devices to move them inwardly, toe lasting mechanism including a front arm connected to said slide to be swung toward the toe by the movement of the slide, and means for moving the arm relatively to said slide to wipe the upper heightwise of the toe and inwardly over the bottom of the shoe.

43. A machine of the class described having, in combination, pulling-over means, side-overlaying and fastening devices, a controlling slide connected to said devices to move them inwardly, toe lasting mechanism including a front arm connected to said slide to be swung toward the toe by the movement of the slide, and means for swinging the arm relatively to said slide to work the upper inwardly over the bottom of the shoe.

44. A machine of the class described having, in combination, pulling-over means, side overlaying and fastening devices, a controlling slide connected to said devices to move them inwardly, toe lasting mechanism including a front arm connected to said slide to be swung toward the toe by the movement of the slide, and operating means for imparting to said arm lengthwise movement and swinging movement while the slide is stationary to wipe the upper heightwise of the toe and inwardly over the bottom of the shoe.

45. A machine of the class described having, in combination, pulling-over means, side overlaying and fastening devices, a controlling slide connected to said devices to move them inwardly, toe lasting means including a front arm and wipers supported thereon, a device arranged to provide a fulcrum for said arm between the opposite ends of the arm, said device and the arm being connected to said slide for swinging the arm about one of its ends to carry the wipers toward the shoe through the movement of the slide, and means for swinging the arm about said intermediate fulcrum to impart operative movement to the wipers.

46. A machine of the class described having, in combination, pulling-over means, side overlaying and fastening devices, a controlling slide connected to said devices to move them inwardly, toe lasting mechanism including a front arm and wipers supported thereon, a device arranged to provide a fulcrum for said arm between the opposite ends of the arm and constructed to permit lengthwise movements of the arm in addition to swinging movements, connections for moving said fulcrum device and the arm to swing the wipers toward the shoe by the operative movement of said slide, and operating means for thereafter moving the arm lengthwise relatively to said fulcrum device to upwipe the upper and for swinging the arm about its fulcrum point on said device to overwipe the upper.

47. A machine of the class described having, in combination, means for pulling an upper over a last, toe-embracing wipers and power-driven means for operating them to upwipe and to overwipe the upper, and automatic means for fastening the upper about the toe in overwiped position.

48. A machine of the class described having, in combination, means for pulling an upper over a last, toe-embracing wipers and means for operating them to upwipe and to overwipe the upper, and means for applying a binder about the toe and for fastening it in time relation to the overwiping operation to hold the upper in lasted position.

49. A machine of the class described having, in combination, pulling-over means comprising toe and side grippers, toe-embracing wipers, mechanism for effecting relative movement of said wipers and the shoe after the upper has been pulled by said grippers to wipe the upper heightwise of the toe and in time relation to said upwiping operation to wipe it inwardly over the bottom of the shoe, and means for applying a binder about the toe and for fastening it to the shoe to hold the upper in lasted position.

50. A machine of the class described having, in combination, means for pulling an upper over a last, toe-embracing wipers, operating mechanism for moving said wipers heightwise of the toe to upwipe the upper and for moving them inwardly to overwipe the upper, and mechanism automatically operative in time relation to said wipers to apply a binder about the toe and to force the ends of the binder into the shoe.

51. A machine of the class described having, in combination, pulling-over means automatically operative to pull an upper over the toe of a last and to come to a stop with the upper held under tension, and toe lasting mechanism automatically operative upon a subsequent starting of the machine to upwipe and to overwipe the upper and to apply a binder about the toe and fasten the binder to the shoe.

52. A machine of the class described having, in combination, means for pulling an upper over a last, toe-embracing wipers, mechanism for effecting relative movement of said wipers and the shoe to wipe the upper heightwise of the toe and inwardly over the bottom of the shoe, and automatic means for applying a binder about the toe and for forcing the ends of the binder into the shoe.

53. A machine of the class described, having, in combination, means for pulling an upper over a last, means for wiping the upper heightwise of the toe and inwardly over the bottom of the last, and means for applying about the toe a binder provided with angled ends and for forcing said ends into the shoe.

54. A machine of the class described having, in combination, means for pulling an upper over a last, and power-driven toe lasting mechanism comprising means for upwiping and for overwiping the upper and means for applying a binder about the toe and for forcing its ends into the shoe.

55. In a machine of the class described, the combination with shoe positioning means, of toe-embracing wipers, and operating mechanism for moving said wipers heightwise of the toe to wipe the upper to the edge of the shoe bottom and for thereafter imparting to said wipers repeated movements inwardly over the bottom of the shoe in automatically determined time relation to their upwiping movement.

56. In a machine of the class described, the combination with shoe positioning means, of toe-embracing wipers, and operating mechanism having an automatically determined cycle of operations for imparting to said wipers in time relation repeated upwiping movements heightwise of the toe and thereafter overwiping movement over the bottom of the shoe.

57. In a machine of the class described, the combination with shoe positioning means, of toe-embracing wipers, and power driven operating means for imparting to said wipers repeated upwiping movements and thereafter in automatically determined time relation to said upwiping movements repeated overwiping movements.

58. In a machine of the class described, the combination with shoe positioning means, of toe-embracing wipers for wiping the upper heightwise of the toe and inwardly over the bottom of the shoe, and operating means for said wipers including mechanism having an automatically determined cycle of operations for imparting to the wipers prior to their overwiping movement a plurality of upwiping movements in time relation to one another.

59. In a machine of the class described, the combination of shoe positioning means, toe-embracing wipers, and automatic means for effecting relative movement of said shoe positioning means and the wipers in a closed path to wipe the upper repeatedly heightwise of the toe.

60. In a machine of the class described, the combination with shoe positioning means, of toe-embracing wiper mechanism mounted to move in an automatically determined closed path to wipe the upper repeatedly heightwise of the toe, and means for imparting to the wipers operative movement in said closed path.

61. In a machine of the class described, the combination with shoe positioning means, of toe-embracing wipers, and automatic means for controlling said wipers to cause them to move in a closed path to wipe the upper heightwise of the toe and then to relax their pressure on the shoe and return into position to repeat the upwiping operation.

62. In a machine of the class described, the combination with shoe positioning means, of toe-embracing wipers, and power-operated means for closing said wipers about the toe and for moving them heightwise of the toe to upwipe the upper and for thereafter opening them and returning them substantially out of contact with the shoe and then repeating the upwiping operation.

63. In a machine of the class described, the combination with shoe positioning means, of toe-embracing wipers, and operating mechanism for imparting automatically to said wipers repeated overwiping movements of predetermined extent to force the upper into the angle between the feather and the rib of the insole.

64. In a machine of the class described, the combination of shoe positioning means, end-embracing wipers, and operating mechanism for effecting relative movement of said shoe positioning means and the wipers in an automatically determined closed path to wipe the upper repeatedly inward over the bottom of the shoe.

65. In a machine of the class described, the combination with shoe positioning means, of end-embracing wipers, and operating mechanism automatically controlled to move said wipers in a closed path to wipe the upper inwardly over the bottom of the shoe a plurality of times and between successive inward movements of the wipers to relax their pressure on the shoe and return them for the next overwiping operation.

66. In a machine of the class described, the combination with shoe positioning means, of toe-embracing wipers, and operating means having an automatically determined cycle of operations for imparting to said wipers repeated over-wiping movements of progressively increasing extent to force the upper inwardly against the rib of the insole.

67. In a machine of the class described, the combination with shoe positioning means, of end-embracing wipers, and operating mechanism automatically controlled to impart to said wipers repeated overwiping movements in a direction oblique to the plane of the sole and to increase the extent of such overwiping movement with each successive overwipe.

68. In a machine of the class described, the combination with shoe positioning means, of end-embracing wipers, operating means for moving said wipers in an automatically determined closed path to wipe the upper repeatedly over the bottom of the shoe, and automatic means for varying said path of movement of the wipers to increase the extent of their overwiping movement in successive overwiping operations on the shoe.

69. In a machine of the class described, the combination with shoe positioning means, of end-embracing wipers, operating mechanism for moving said wipers in a closed path to wipe the upper repeatedly inward over the bottom of the shoe with a component of movement transversely of the plane of the sole to press the upper on the sole, and automatic means for varying said path of movement of the wipers to increase the extent of their movement both inwardly and transversely of the plane of the sole in successive overwiping operations on the shoe.

70. In a machine of the class described, the combination with shoe positioning means, of end-embracing wipers, and automatic means for imparting to said wipers repeated movements lengthwise and laterally of the shoe to wipe the upper inwardly over the sole including positive means for determining the extent of movement of the wipers lengthwise of the shoe.

71. In a machine of the class described, the combination with shoe positioning means, of end-embracing wipers, and wiper operating mechanism comprising means for imparting positively to said wipers repeated overwiping movements lengthwise of the shoe and for increasing automatically the extent of such movement of the wipers in successive overwiping operations.

72. In a machine of the class described, the combination with shoe positioning means, of toe-embracing wipers, means for effecting relative movement of said shoe positioning means and wipers to wipe the upper heightwise of the toe, and mechanism for thereafter imparting automatically to said wipers movement in a closed path to wipe the upper repeatedly over the bottom of the shoe.

73. In a machine of the class described, the combination with shoe positioning means, of toe-embracing wipers, means for effecting relative movement of said shoe positioning means and wipers to wipe the upper heightwise of the toe, operating mechanism for imparting to the wipers after the upwiping operation has been completed repeated movements inwardly over the bottom of the shoe to overwipe the upper, and automatic means for increasing the extent of inward movement of the wipers in successive overwiping operations.

74. In a machine of the class described, the combination with shoe positioning means, of toe-embracing wiper mechanism comprising wipers mounted for movement in an automatically determined closed path to wipe the upper repeatedly heightwise of the toe and for movement in an automatically determined closed path to wipe the upper repeatedly inward over the bottom of the shoe.

75. In a machine of the class described, the combination with shoe positioning means, of toe-embracing wipers, and automatic operating means for imparting to said wipers repeated movements heightwise of the toe to upwipe the upper and thereafter repeated movements inwardly over the bottom of the shoe to overwipe the upper, including mechanism for automatically relaxing the pressure of the wipers on the shoe between successive upwiping movements and between successive overwiping movements.

76. In a machine of the class described, the combination with shoe positioning means, of toe-embracing wipers, and power-driven operating means for imparting to said wipers movement in an automatically determined closed path to upwipe the upper repeatedly and thereafter movement in an automatically determined closed path to overwipe the upper repeatedly.

77. In a machine of the class described, the combination with shoe positioning means, of end-embracing wipers, a member having a fixed throw for imparting inward and outward movements repeatedly to said wipers, connections between said member and the wipers including parts relatively adjustable to vary the extent of the inward movements of the wipers, and automatic means for effecting relative adjustment of said parts to vary the extent of said inward movements in the course of the operation of the wipers on a shoe.

78. In a machine of the class described, the combination with shoe positioning means, of end-embracing wipers, a member having a fixed throw for imparting inward and outward movements repeatedly to said wipers, connections between said member and the wipers comprising parts relatively adjustable to vary the extent of the inward movements of the wipers, and a cam automatically operative to control the extent of the inward movements of the wipers by relative adjustment of said parts.

79. In a machine of the class described, the combination with shoe positioning means, of end-embracing wipers, operating mechanism for imparting to said wipers repeated inward movements to wipe the upper over the bottom of the shoe, said operating mechanism comprising a member having a fixed throw and connections between said member and the wipers adjustable to vary the extent of movement imparted to the wipers by said member, and cam means for adjusting said connections in time relation to the movements of said member to increase the extent of the movement of the wipers each time that they are moved inwardly.

80. In a machine of the class described, the combination with shoe positioning means, of end-embracing wipers, operating mechanisms for imparting respectively to said wipers movements lengthwise of the shoe and movements heightwise of the shoe to overwipe and compress the margin of the upper, said operating mechanisms each comprising an operating member having a fixed throw and connections adjustable to vary the extent of movement imparted to the wipers by said member, and cams automatically operative to adjust said connections to increase the extent of the movement of the wipers inwardly and heightwise of the shoe in successive operations of the wipers on the shoe.

81. In a machine of the class described, the combination with shoe positioning means, of end-embracing wipers, and power-driven operating mechanism for imparting inward and outward movements repeatedly to said wipers comprising connections adjustable to vary the extent of the inward movement, and automatic means for adjusting said connections to cause the wipers to move farther inwardly in successive inward movements.

82. In a machine of the class described, the combination with shoe positioning means, of toe-embracing wipers, operating mechanism for imparting to said wipers in an automatically determined cycle repeated inward movements to wipe the upper into the angle between the feather and the rib of the sole comprising connections adjustable to vary the limit of inward movement of the wipers, and mechanism for adjusting said connections in time relation to the wiper movements to vary said limit in successive inward movements.

83. In a machine of the class described, the combination with shoe positioning means, of toe-embracing wipers, operating mechanism for moving said wipers repeatedly heightwise of the toe to upwipe the upper, and mechanism automatically operative in time relation to said upwiping movements to vary the limit of said movements.

84. In a machine of the class described, the combination with shoe positioning means, of toe-embracing wipers, operating mechanism for moving said wipers repeatedly heightwise of the toe to upwipe the upper comprising a member having a fixed throw and connections adjustable to vary the extent of movement imparted to the wipers by said member, and automatic means for adjusting said connections to cause the wipers to move to a different limit in one upwiping movement than in the preceding upwiping movement.

85. In a machine of the class described, the combination with shoe positioning means, of toe-embracing wipers, means for moving said wipers repeatedly heightwise of the toe to upwipe the upper, a member having a fixed throw for moving the wipers toward and from the end of the toe in time relation to their upwiping movements and for thereafter moving them inwardly over the bottom of the shoe to overwipe the upper, connections between said member and the wipers adjustable to vary the extent of movement imparted to the wipers by the member, and automatic means for adjusting said connections to increase the extent of wiper movement for the overwiping operation.

86. In a machine of the class described, the combination with shoe positioning means, of toe-embracing wipers, means for moving said wipers inwardly over the bottom of the shoe to overwipe the upper, a member having a fixed throw for imparting to said wipers upwiping movement heightwise of the toe prior to their overwiping movement and for also moving them heightwise of the toe to apply pressure to the margin of the upper in the overwiping operation, connections between said member and the wipers adjustable to vary the extent of the movement of the wipers heightwise of the toe, and automatic means for adjusting said connections to reduce the extent of such heightwise movement between the upwiping operation and the overwiping operation.

87. In a machine of the class described, the combination with shoe positioning means, of toe-embracing wipers, operating mechanisms for imparting respectively to said wipers movement heightwise of the shoe and movement lengthwise of the shoe in time relation, first to upwipe the upper and then to overwipe and compress the margin of the upper, said operating mechanisms each comprising an operating member having a fixed throw and connections adjustable to vary the extent of movement imparted to the wipers by said member, and cams automatically operative to adjust said connections to determine the extent of movement of the wipers in said different directions for the upwiping and for the overwiping and compressing of the upper.

88. In a machine of the class described, the combination with shoe positioning means, of toe-embracing wipers, operating members for imparting respectively to the wipers movement heightwise of the toe and movement lengthwise of the shoe both to upwipe and to overwipe the upper, and cams associated respectively with said different members for determining automatically the extent of movement of the wipers in the different directions.

89. In a machine of the class described, the combination with shoe positioning means, of end-embracing wipers, and a wiper support mounted for swinging movement about one axis to carry said wipers toward the shoe and for swinging movement about a different axis to move said wipers inwardly over the bottom of the shoe.

90. In a machine of the class described, the combination with shoe positioning means, of end-embracing wipers, and a wiper support comprising an arm mounted to swing about an axis at its outer end to carry the wipers toward the shoe and to swing about an axis between its opposite ends to move the wipers inwardly over the bottom of the shoe.

91. In a machine of the class described, the combination with shoe positioning means, of end-embracing wipers, a wiper support comprising an arm mounted for swinging movement to carry the wipers toward the shoe, a device constructed to provide a fulcrum for said arm in a different location from the axis of said swinging movement, and means for swinging the arm about said fulcrum to move the wipers inwardly over the bottom of the shoe.

92. In a machine of the class described, the combination with shoe positioning means, of end-embracing wipers, a wiper support comprising an arm mounted to swing about an axis at its outer end to carry the wipers toward the shoe, a device constructed to provide a fulcrum for said arm between its opposite ends, means for swinging the arm about said axis and for moving said fulcrum device with the arm to position the wipers relatively to the shoe, and means for thereafter swinging the arm about said fulcrum to move the wipers inwardly over the bottom of the shoe.

93. In a machine of the class described, the combination with shoe positioning means, of end-embracing wipers, a wiper support comprising an arm mounted for swinging movement to carry the wipers toward the shoe, a device movable with said arm and constructed to provide a fulcrum for the arm, means for locking said device after the wipers have been swung toward the shoe, and means for thereafter swinging the arm about said fulcrum to move the wipers over the bottom of the shoe.

94. In a machine of the class described, the combination with shoe positioning means, of end-embracing wipers, an arm supporting the wipers on one of its ends and movable about an axis between its opposite ends to impart overwiping movement to the wipers, and mechanism connected to the arm at the opposite side of said axis from the wipers for swinging it about said axis and also for moving it lengthwise relatively to said axis to impart upper compressing movement to the wipers.

95. In a machine of the class described, the combination with shoe positioning means, of end-embracing wipers, a wiper supporting arm, a device constructed to provide a fulcrum for said arm between the opposite ends of the arm, and means for swinging the arm about said fulcrum to move the wipers lengthwise of the shoe and for moving the arm lengthwise relatively to said fulcrum device to move the wipers heightwise to the shoe.

96. In a machine of the class described, the combination with shoe positioning means, of toe-embracing wipers, a wiper supporting arm mounted to swing about an axis at its outer end to position the wipers lengthwise of the shoe, a device constructed to provide a fulcrum for said arm between the opposite ends of the arm, and means for swinging the arm about said fulcrum and for imparting to the arm lengthwise movements to upwipe and to overwipe and compress the upper materials.

97. In a machine of the class described, the combination with shoe positioning means, of toe-embracing wipers, a wiper support, a device providing a fulcrum for said wiper support, means for moving the wiper support and wipers relatively to said fulcrum to wipe the upper heightwise of the toe, and means for swinging the support and wipers about said fulcrum to wipe the upper inwardly over the bottom of the shoe.

98. In a machine of the class described, the combination with shoe positioning means, of end-embracing wipers, means for moving said wipers inwardly lengthwise of the shoe to overwipe the upper, and wiper closing mechanism comprising parts movable in a direction opposite to that of said inward movement of the wipers to close the wipers laterally of the shoe in the overwiping operation.

99. In a machine of the class described, the combination with shoe positioning means, of end-embracing wipers, a wiper support operatively movable to carry said wipers lengthwise of the shoe to overwipe the upper, wiper closing mechanism on said wiper support comprising a member mounted for wiper closing movement lengthwise of the shoe in a direction opposite to the direction of operative movement of the wiper support, and means for imparting wiper closing movement to said member during the operative movement of the wiper support.

100. In a machine of the class described, the combination with shoe positioning means, of end-embracing wipers, rack members, pinions connecting the rack members to the wipers for closing the wipers laterally of the shoe, and means for imparting operative movement to said rack members to close the wipers.

101. In a machine of the class described, the combination with shoe positioning means, of end-embracing wipers, a wiper support movable to carry said wipers lengthwise of the shoe, racks and pinions on said wiper support for closing the wipers, and means for moving said racks relatively to the wiper support to close the wipers during the operative movement of the wiper support lengthwise of the shoe.

102. In a machine of the class described, the combination with shoe positioning means, of end-embracing wipers, a wiper support movable to carry said wipers lengthwise of the shoe, wiper closing mechanism on said wiper support comprising pinions connected to the wipers and racks for operating said pinions, and mechanism automatically operative in time relation to the movement of the wiper support to impart operative movement to said racks to close the wipers.

103. In a machine of the class described, the combination with shoe positioning means, of end-embracing wipers, an arm supporting said wipers and mounted for movement lengthwise of the shoe, rack and pinion mechanism for closing said wipers, a wiper closing arm pivoted on said supporting arm and connected to said rack and pinion mechanism, and means for imparting operative movement to said wiper-closing arm to close the wipers.

104. In a machine of the class described, the combination with shoe positioning means, of end-embracing wipers, pinions connected to said wipers for closing them laterally of the shoe, racks for operating said pinions, and springs connected directly to said pinions for maintaining the wipers normally in open position.

105. In a machine of the class described, the combination with shoe positioning means, of end-embracing wipers, and wiper closing mechanism comprising levers connected respectively to the different wipers and spring means for controlling said levers to render the closing of the wipers yieldable.

106. In a machine of the class described, the combination with shoe positioning means, of end-embracing wipers, and wiper closing mechanism comprising rack bars connected respectively to the different wipers, a lever for controlling each rack bar having one of its arms connected to said rack bar, and spring means for controlling the other arm of each lever to render the closing of the wipers yieldable.

107. In a machine of the class described, the combination with shoe positioning means, of end-embracing wipers, a support for said wipers, a member between which and said wiper support there is provision for relative movement to close the wipers, wiper closing connections comprising arms pivoted on said member and connected to the wipers, and spring means for controlling said arms to render the closing of the wipers yieldable.

108. In a machine of the class described, the combination with shoe positioning means, of end-embracing wipers, a support for said wipers, a member between which and said wiper support there is provision for relative movement to close the wipers, rack bars on said wiper support connected to the wipers, bell-crank levers pivoted on said member and connected to said rack bars, and spring means for controlling swinging movement of said bell-crank levers to render the closing of the wipers yieldable.

109. In a machine of the class described, the combination with shoe positioning means, of end-embracing wipers, a support for said wipers, a member movable relatively to said wiper support to close the wipers, bell-crank levers carried by said member and having arms connected to the wipers for closing them, and spring means for controlling the other arms of said bell-crank levers to render the closing of the wipers yieldable.

110. In a machine of the class described, the combination with shoe positioning means, of end-embracing wipers, and wiper closing mechanisms for the different respective wipers, each of said mechanisms comprising levers relatively movable in response to resistance to the closing of the wipers, and spring means for controlling the relative movement of said levers to render the closing of the wipers yieldable.

111. In a machine of the class described, the combination with shoe positioning means, of end-embracing wipers, a support for said wipers, a member between which and said wiper support there is provision for relative movement to close the wipers, levers pivoted on said member and connected to the wipers to close them, additional levers pivoted on the wiper support and connected to said member to be operated by the relative movement of said support and member, and spring means between said last-named levers and the wiper-connected levers for rendering the closing of the wipers yieldable.

112. In a machine of the class described, the combination with shoe positioning means, of end-embracing wipers, rack bars connected respectively to the different wipers for closing them, and controlling means for each of said rack bars comprising a pair of bell-crank levers relatively movable in the closing of the wipers and spring means for controlling relative movement of said levers to render the closing of the wipers yieldable.

113. In a machine of the class described, the combination with shoe positioning means, of end-embracing wipers, a wiper support, a member between which and said wiper support there is provision for relative movement to close the wipers, rack bars connected respectively to the different wipers, bell-crank levers pivoted on said member and having arms connected to said rack bars, additional bell-crank levers pivoted to swing about axes fixed relatively to the wiper support and having arms connected to said member, and springs between the other arms of said last-named bell-crank levers and the other arms of the wiper-connected bell-crank levers for rendering the closing of the wipers yieldable.

114. In a machine of the class described, the combination with shoe positioning means, of end-embracing wipers, a support for said wipers, rack bars on said wiper support connected to the wipers for closing them, bell-crank levers having arms connected to said rack bars, means for moving said bell-crank levers bodily to close the wipers, and spring means for controlling said bell-crank levers to render them effective to operate the rack bars in their bodily movement and to permit them to yield in response to resistance to the closing of the wipers.

115. In a machine of the class described, the combination with shoe positioning means, of end-embracing wipers, a support for said wipers, rack bars on said wiper support connected to the wipers for closing them, a member movable relatively to the wiper support to close the wipers, bell-crank levers carried by said member and having arms connected to said rack bars, additional bell-crank levers pivoted on the wiper support and having arms connected to said member to be swung by the member in its movement to close the wipers, and springs between the other arms of said additional levers and the other arms of the wiper-connected levers for rendering the closing of the wipers yieldable.

116. In a machine of the class described, the combination with shoe positioning means, of toe-embracing wipers, operating means for moving said wipers heightwise of the toe to upwipe the upper and inwardly over the bottom of the shoe to overwipe the upper, and mechanism automatically operative in time relation to the wipers to fasten the upper in lasted position about the toe.

117. In a machine of the class described, the combination with shoe positioning means, of toe-embracing wipers, means for imparting to said wipers upwiping and overwiping movements in time relation, and automatic means for fastening the upper in lasted position about the toe after the overwiping operation.

118. In a machine of the class described, the combination with shoe positioning means, of toe-embracing wipers, operating means for imparting to said wipers repeated over-wiping movements in time relation to each other, and mechanism timed to operate automatically at the end of the last overwiping movement of the wipers to fasten a toe binder to the shoe to hold the upper in lasted position about the toe.

119. In a machine of the class described, the combination with shoe positioning means, of toe-embracing wipers and operating means therefor having an automatically determined cycle of operations to upwipe the upper a plurality of times and thereafter to overwipe the upper a plurality of times, and mechanism automatically operative after the last overwiping movement of the wipers to fasten the upper in lasted position about the toe.

120. In a machine of the class described, the combination with shoe positioning means, of toe-embracing wipers and means for moving them heightwise of the toe and inwardly over the bottom of the shoe to upwipe and to overwipe the upper, and mechanism automatically operative in time relation to the overwiping movement of the wipers to fasten a binder about the toe to hold the upper in lasted position.

121. In a machine of the class described, the combination with shoe positioning means, of toe-embracing wipers movable heightwise of the toe to upwipe the upper and inwardly over the bottom of the shoe to overwipe the upper, binder applying and fastening mechanism movable with the wipers in their upwiping movement, and means for operating said binder applying and fastening mechanism in time relation to the overwiping movement of the wipers.

122. In a machine of the class described, the combination with shoe positioning means, of means for wiping the upper heightwise of the toe and inwardly over the bottom of the shoe, and mechanism automatically operative in time relation to the wiping means to apply a binder about the toe and to force the ends of the binder into the shoe to anchor it to the shoe.

123. In a machine of the class described, the combination with shoe positioning means, of toe-embracing wipers, operating means for effecting relative movement of the shoe and said wipers to wipe the upper heightwise of the toe and inwardly over the bottom of the shoe, means for supporting adjacent to the wipers in the upwiping operation a binder having projections thereon to be forced into the shoe, and mechanism automatically operative in time relation to the overwiping operation to force said projections into the shoe to anchor the binder.

124. In a machine of the class described, the combination with shoe positioning means, of toe-embracing wipers, means for moving the said wipers heightwise of the toe to upwipe the upper and inwardly over the bottom of the shoe to overwipe the upper, binder applying mechanism movable heightwise of the toe with the wipers and constructed to apply about the toe a binder having angled ends and to force said ends into the shoe, and automatic means for operating said binder applying mechanism to apply the binder and to force its ends into the shoe in time relation to the overwiping movement of the wipers.

125. In a machine of the class described, the combination with shoe positioning means, of toe lasting mechanism comprising means for working an upper into lasted position and means for applying a binder about the toe to hold the upper, and binder positioning means comprising a gripper constructed and arranged to grip and hold the binder substantially midway between its opposite ends during the working of the upper into lasted position.

126. In a machine of the class described, the combination with shoe positioning means, of toe-embracing wipers, means adjacent to said wipers for applying a binder about the toe, and means for gripping and holding the binder in operative relation to said binder applying means during the operation of the wipers.

127. In a machine of the class described, the combination with shoe positioning means, of toe-embracing wipers, means for effecting relative movement of said wipers and the shoe to wipe the upper heightwise of the toe and inwardly over the bottom of the shoe, binder applying mechanism comprising members movable along the overwiping faces of said wipers to apply a binder about the toe, and a gripper arranged to grip and hold the binder in operative relation to said binder applying members during the upwiping operation of the wipers.

128. In a machine of the class described, the combination with shoe positioning means, of toe-embracing wipers, means for moving said wipers heightwise of the toe to upwipe the upper and inwardly over the bottom of the shoe to overwipe the upper, mechanism for applying a binder about the toe movable heightwise of the toe with said wipers, and a gripper also movable heightwise of the toe with the wipers and constructed to grip and hold the binder during the upwiping operation.

129. In a machine of the class described, the combination with shoe positioning means, of toe lasting mechanism comprising toe-embracing wipers and means for applying a binder about the toe, means for effecting relative movement of the shoe and said toe lasting mechanism heightwise of the toe to upwipe the upper, and a gripper arranged to position and hold the binder relatively to said toe lasting mechanism during the upwiping operation.

130. In a machine of the class described, the combination with shoe positioning means, of toe-embracing wipers, mechanism for effecting relative movement of the shoe and said wipers to upwipe the upper, members movable along the overwiping faces of said wipers to apply a binder about the toe, and means for gripping the binder substantially midway between its opposite ends and for holding it retracted from the edges of the wipers during the upwiping operation.

131. In a machine of the class described, the combination with shoe positioning means, of toe lasting mechanism including means for applying a binder about the toe, means for presenting a binder to said toe lasting mechanism, a gripper movable to transfer the binder from said presenting means to the lasting mechanism, and controlling means to cause the gripper to maintain its hold on the binder until after the toe lasting mechanism has begun its operation on the shoe.

132. In a machine of the class described, the combination with shoe positioning means, of toe-embracing wipers, means for supporting a binder adjacent to the overwiping faces of said wipers, means for presenting a binder adjacent to the wipers, and binder transferring mechanism comprising a gripper movable to transfer the binder from said presenting means into position between said supporting means and the wipers and automatically operative thereafter to maintain its hold on the binder in the operation of the wipers on the shoe.

133. In a machine of the class described, the combination with shoe positioning means, of toe lasting mechanism comprising means for applying a binder about the toe, a gripper for gripping the binder and for holding it in position to be operated upon by the binder applying means, and mechanism automatically operative in time relation to the binder applying means to cause the gripper to release the binder.

134. In a machine of the class described, the combination with shoe positioning means, of toe lasting mechanism comprising toe-embracing wipers and means for applying a binder about the toe, means for effecting relative movement of the shoe and said toe lasting mechanism to wipe the upper heightwise of the toe, a gripper for gripping and holding a binder in said toe lasting mechanism during the upwiping operation, and a device arranged to be operated after the upwiping operation to release the binder from the gripper.

135. In a machine of the class described, the combination with shoe positioning means, of toe-embracing wipers movable heightwise of the toe to upwipe the upper and inwardly over the bottom of the shoe to overwipe the upper, binder applying members movable heightwise of the toe with said wipers and movable along the overwiping faces of the wipers to apply a binder about the toe, a gripper also movable heightwise of the toe with the wipers to hold the binder during the upwiping operation, and means for releasing the binder from said gripper after the upwiping operation has been completed.

136. In a machine of the class described, the combination with shoe positioning means, of toe-embracing wipers, members movable along the overwiping faces of said wipers to apply a binder about the toe, a gripper for holding the binder adjacent to said faces, and a device automatically operative in time relation to said binder applying members to release the binder from the gripper.

137. In a machine of the class described, the combination with shoe positioning means, of means for wiping the upper into lasted position about the toe, means for applying a binder about the toe, a gripper for holding the binder in position to be operated upon by said binder applying means, and a device controlled by said binder applying means for releasing the binder from the gripper.

138. In a machine of the class described, the combination with the shoe positioning means, of toe-embracing wipers, members movable along the overwiping faces of said wipers to apply a binder about the toe, a gripper for holding the binder in position to be operated upon by said members, means for operating said binder applying members, and mechanism controlled by said operating means for releasing the binder from the gripper.

139. In a machine of the class described, the combination with shoe positioning means, of toe-embracing wipers, a wiper support, members movable along the wipers to apply a binder about the toe, a gripper on the wiper support for holding the binder, said gripper having a latch for holding its jaws in closed position, mechanism on the wiper support for operating said binder applying members, and a latch controlling device operative in response to the movement of said mechanism to release the binder from the gripper.

140. In a machine of the class described, the combination with shoe positioning means, of toe-embracing wipers, members movable along the overwiping faces of said wipers to apply a binder about the toe, and a gripper for transferring a binder into position to be operated upon by said members, said wipers having a recess extending transversely of their overwiping faces to receive the gripper for positioning the binder close to said faces.

141. In a machine of the class described, the combination with shoe positioning means, of toe-embracing wipers, members movable along the overwiping faces of said wipers to apply a binder about the toe, a gripper movable forwardly to receive a binder and rearwardly to transfer the binder into position to be operated upon by said members, the wipers having a recess extending transversely of their overwiping faces to receive the gripper, and means for guiding the gripper into and out of said recess in the wipers.

142. In a machine of the class described, the combination with shoe positioning means, of toe-embracing wipers, members movable along the overwiping faces of said wipers to apply a binder about the toe, a gripper for presenting a binder in position to be operated upon by said members, the wipers having a recess extending transversely of their overwiping faces to receive said gripper, and means for controlling said gripper to cause it to move transversely of said faces to withdraw it from said recess and then along the plane of said faces to receive a binder and thereafter to move reversely along said plane and into said recess.

143. In a machine of the class described, the combination with shoe positioning means, of toe-embracing wipers, members movable along the overwiping faces of said wipers to apply a binder about the toe, a gripper movable to transfer a binder into position to be operated upon by said members, the wipers having a recess in their overwiping faces spaced from their wiping edges to receive the gripper, and means for controlling the movement of the gripper to cause it to move into and out of said recess clear of the edges of the wipers.

144. In a machine of the class described, the combination with shoe positioning means, of toe-embracing wipers, members movable along the overwiping faces of said wipers to apply a binder about the toe, a gripper movable forwardly to receive a binder and rearwardly to carry the binder into position to be operated upon by said members, and guiding means for said gripper to cause it to move transversely of the plane of the wipers at the end of its binder transferring movement to position the binder close to the wipers.

145. In a machine of the class described, the combination with toe lasting mechanism, of binder forming mechanism, a binder carrier arranged relatively to said forming mechanism to hold the binder in the position in which it is formed and movable to carry it to the lasting mechanism, and means for operating said carrier.

146. In a machine of the class described, the combination with toe lasting mechanism, of binder forming mechanism comprising devices for bending the ends of a section of binder wire and means for feeding wire to said devices, a binder carrier arranged to be presented in the line of feed of the wire to receive the wire before the binder is formed, and means for operating said carrier to carry the binder to the lasting mechanism.

147. In a machine of the class described, the combination with toe lasting mechanism, of binder forming mechanism comprising an anvil member and means for feeding binder wire along said member, and a carrier for carrying the binder from the forming mechanism to the lasting mechanism, said anvil member having recesses and the carrier having parts arranged to enter said recesses in the line of feed of the wire to receive the wire before the binder is formed.

148. In a machine of the class described, the combination with toe lasting mechanism, of binder forming mechanism, a carrier movable to carry a binder from the forming mechanism to the lasting mechanism and then to return to the forming mechanism, and means automatically operative to eject the binder from the carrier in the event of failure of the carrier to deliver the binder to the lasting mechanism.

149. In a machine of the class described, the combination with toe lasting mechanism, of binder forming mechanism, a carrier movable to carry a binder from the forming mechanism to the lasting mechanism and then to return to the forming mechanism, and a device arranged to be operated by such return movement of the carrier to eject from the carrier any binder which may be accidentally retained therein.

150. In a machine of the class described, the combination with upper pulling means comprising a gripper for pulling the upper and for thereafter holding it under tension with the machine at rest, and means automatically operative upon a subsequent starting of the machine to overlay and fasten the margin of the upper, of power-operated gripper controlling means arranged to be rendered operative at will while the machine is at rest between the upper pulling and the overlaying and fastening operations to cause said gripper in its upper pulling position to relax its grip on the upper.

151. In a machine of the class described, the combination with toe and side grippers and means for operating them to pull an upper over a last, and power-operated means for overlaying and fastening the margin of the upper upon a subsequent starting of the machine, of supplemental power-operated means arranged for optional use between the upper pulling and the overlaying and fastening operations to cause the toe gripper in its upper pulling position to relax its grip on the upper.

152. In a machine of the class described, the combination with a gripper for pulling an upper and for holding it under tension, and means for overlaying and fastening the margin of the upper, of power-operated controlling means arranged for optional use prior to the overlaying and fastening operation to cause the gripper in its upper pulling position to release the upper.

In testimony whereof I have signed my name to this specification.

CHARLES F. PYM.